(12) United States Patent
Schienbein et al.

(10) Patent No.: US 6,198,178 B1
(45) Date of Patent: Mar. 6, 2001

(54) STEP WAVE POWER CONVERTER

(75) Inventors: Lawrence A. Schienbein, Kennewick; Gerald W. Droppo, Richland; Matthew K. Donnelly, Kennewick, all of WA (US); Brent Earle Harris, Calgary (CA)

(73) Assignee: International Power Systems, Inc., Calgary (CA)

( * ) Notice: Subject to any disclaimer, the term of this patent is extended or adjusted under 35 U.S.C. 154(b) by 0 days.

(21) Appl. No.: 09/468,610

(22) Filed: Dec. 21, 1999

(51) Int. Cl.$^7$ ...................................................... H02J 1/00
(52) U.S. Cl. .................................................. 307/82; 307/83
(58) Field of Search ................................. 307/82, 83, 17; 363/71, 43

(56) References Cited

U.S. PATENT DOCUMENTS

| | | |
|---|---|---|
| 3,491,282 * | 1/1970 | Heinrich et al. . |
| 3,628,123 | 12/1971 | Rosa et al. . |
| 3,648,149 | 3/1972 | Brown et al. . |
| 3,792,286 * | 2/1974 | Meier ...................................... 307/58 |
| 4,366,532 | 12/1982 | Rosa et al. . |
| 5,373,433 | 12/1994 | Thomas . |
| 5,631,820 | 5/1997 | Donnelly et al. . |
| 5,896,281 * | 4/1999 | Bingley .................................. 363/71 |

* cited by examiner

Primary Examiner—Shawn Riley
(74) Attorney, Agent, or Firm—Marger Johnson & McCollom, P.C.

(57) ABSTRACT

A single- or multi-phase step wave power converter includes multiple transformers configured to receive DC voltage from one or more power sources. Each of the transformers includes a primary winding and a secondary winding. The transformers are each configured to supply a step for a step wave AC output. Bridge circuits are supplied for controlling input of DC voltage into the primary windings of the transformers. Steps for the step wave AC output are output from the secondary windings based upon the input provided to the primary windings. DC source management circuitry manages which DC power source(s) supplies DC voltage input to each of the bridge circuits. The management circuitry provides seamless power switching between the plurality of DC power sources based on each power source's performance characteristics. A pulse-width modulator can also be provided to the step wave power converter to modulate the input into a selected primary winding. In this way, the step wave AC output can be fine-tuned in substantial conformance with an ideal AC waveform.

25 Claims, 15 Drawing Sheets

X=GATE
•=CONNECTION

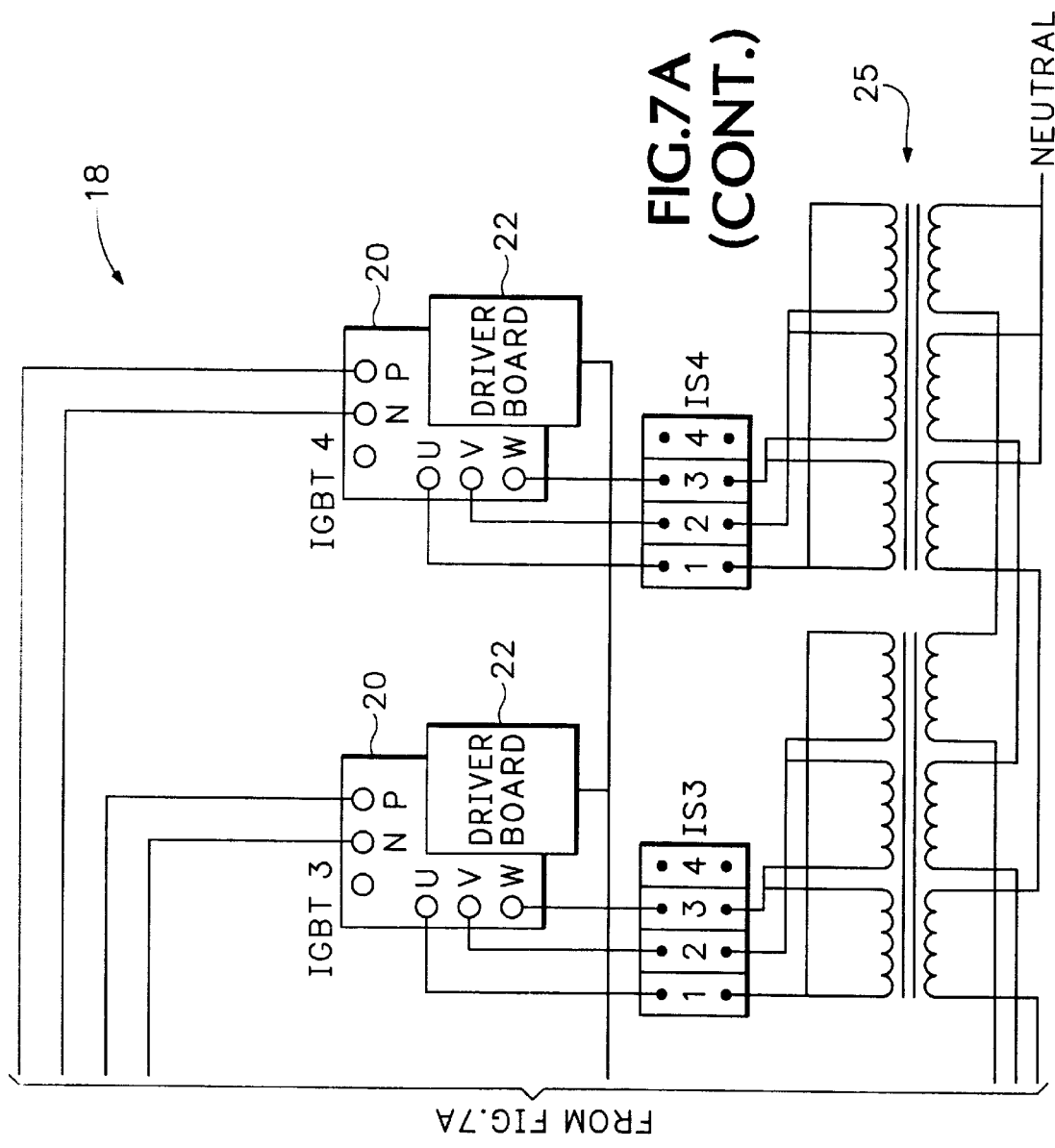

TYPICAL UPS

SWPC MODIFIED

US 6,198,178 B1

STEP WAVE POWER CONVERTER

BACKGROUND OF THE INVENTION

This invention relates generally to step wave power converters for transforming power from power sources supplying DC voltage input into AC power. More specifically, this invention relates to step wave power converters for providing greater input control over multiple DC power buses and for more accurately simulating single- or multiple-phase AC waveforms. While this invention is particularly directed to the transformation of power from DC power sources to AC power, it should be noted that AC power sources can be readily converted to DC power sources through the use of a rectifier. Therefore, the scope of this invention is not limited to strictly DC-to-AC power conversion.

Prior art patents and publications describe various single-phase step wave power converters for transforming DC voltage input into a step wave AC output. FIG. 1 is a schematic illustration showing one example of a prior art power converter. Referring to FIG. 1, one single-phase step wave power converter of the prior art uses one transformer 2 for each step of the step wave output. A single DC power source is used to supply power to each of the transformers 2 in the power converter. Each transformer 2 has three windings, including two primary windings P1, P2 and one secondary winding S. The two primary windings P1 and P2 are electrically coupled to the DC power source through four gates G1–G4. The gates G1–G4 control the flow of current through the primary windings P1, P2 in order to produce a step of the AC output from the secondary winding S. The two primary windings P1, P2 in each transformer 2 are identical to each other except that they are oppositely connected to the DC voltage source. Because of their reverse connections, they induce opposite polarity voltage in the secondary winding S. The secondary windings S of the transformers are connected together in series so that their outputs can be combined to produce the step wave AC output.

In operation, the gates G1–G4 are controlled to alternately pulse DC current through the primary windings P1, P2. Current flow through a positive polarity primary winding P1 induces a positive step output from the corresponding secondary winding S, while, conversely, the flow of current through a negative polarity primary winding P2 induces a negative step. Steps from the secondary windings S of all of the transformers 2 are added together to form the overall AC waveform. Consequently, pulsing DC current through the primary windings PI, P2 at the appropriate time intervals causes the secondary windings S to output an approximate AC waveform.

U.S. Patent No. 5,373,433 issued to Thomas (Thomas) provides an improvement in the art with respect to single-phase power inverters operating from a single DC power source. Specifically, Thomas discloses switching bridges for controlling DC voltage input into multiple transformers from a single source. Each switching bridge includes four switches arranged in two parallel lines, each of which has two series connected switches. The switching bridges are controlled so that the transformers produce either a positive, zero, or negative output voltage step at a given time. According to Thomas, the transformers "preferably have turns ratios that are multiples of each other in order to provide both good resolution and a wide dynamic range of the [AC output] signal." Col. 5, ll. 58–62. For example, Thomas explicitly discloses a single-phase power converter having three transformers capable of producing voltage outputs from their secondary windings of ⊔15V, ±45V, and ±135V, respectively. The output voltages from the secondary windings of all of the transformers are combined in series. Thomas produces a fairly accurate AC waveform by controlling timing and sequencing of the voltage contributions from the three transformers to transition sequentially through each of twenty-seven different possible overall output voltage levels. A special decoder circuit is also provided to prevent accidental shorting across the DC voltage input which would occur if two switches in a series connected pair were closed at the same time. Despite its improvements, Thomas does not contemplate either the use of multiple power sources or three-phase operation.

Another prior art topology is described in U.S. Pat. No. 5,631,820 issued to Donnelly et al. (Donnelly). Donnelly provides an improvement in the art by using three gates instead of four to control current flow through primary transformer windings. Also, although using transformers having two primary windings and one secondary winding, Donnelly's switching architecture allows each primary winding to be used to produce either a positive or a negative step, rather than only one or the other. Donnelly also provides an improvement in the art by contemplating the use of multiple power sources, but fails to provide seamless integration and management of the multiple power sources based on their performance characteristics. Donnelly also discloses a three-phase power converter topology that has nine gates and one three winding, three-phase transformer per step.

Other prior art patents and publications also describe three-phase step wave power converters for converting DC voltage from one or more DC power sources to a step wave AC output. Referring to FIG. 2, one example of a prior art three-phase step wave power converter includes multiple three-phase transformers 4, each having three windings (two primary P1, P2 and one secondary S) per phase per step. The configuration of each phase is similar to the single-phase arrangement of the prior art described above with reference to FIG. 1. Each phase of each transformer includes two primary windings P1, P2 and a secondary winding S. The two primary windings P1, P2 of each phase are identical to each other except for their opposite connections to the DC power source. Four switches G1–G4 are used to control current flow through the primary windings P1, P2 of each phase. The switches are used to alternately pulse DC voltage through the primary windings P1, P2 in order to generate steps of the AC waveform for that particular phase from a corresponding secondary winding S. The contributions output from the secondary windings S of the transformers for a given phase are combined together in series to produce the step wave AC output for that phase.

Unfortunately, this prior art configuration is bulky, requiring a three winding, three-phase transformer 4 controlled by 12 gates for each step. Also, each primary winding P1, P2 contributes only one positive or one negative step towards the overall AC waveform output and the total number of steps of the AC output directly corresponds to the number of primary windings used to produce the output. To get better resolution in this three-phase AC waveform output, therefore, more transformers must be added to the system, further increasing its bulkiness.

It should be noted that in each of the prior art three-phase step wave converters, the three-phase transformers 4 used are wye-wye transformers, meaning that both the primary P1, P2 and secondary windings S are arranged in wye configurations. This configuration is presumably used to avoid voltage contention which occurs between delta and wye connections in delta-wye transformers.

A further drawback of each of the prior art power converters is that the step wave AC output is generally blocky as a result of the mere addition of positive and/or negative block steps to form the AC waveform output. Although blocky AC waveforms are acceptable for many applications, they are less than desirable for use in many modern electronic devices such as computers, televisions, etc., which perform better and last longer when power is supplied to them using a closely regulated AC power supply.

Therefore, the industry faces several problems related to conventional step wave power conversion. First of all, the industry has been unable to seamlessly integrate power from multiple power sources based on their performance characteristics. The industry has also failed to produce a step wave AC output that more closely approximates an ideal AC waveform. Additionally, the industry has been unable to produce a three-phase step wave AC power output in a more efficient manner. The industry has further failed to enhance the resolution of the AC waveform output from a three-phase step wave power converter without increasing the number of primary transformer windings. Furthermore, the industry has not succeeded in allowing a single power source to selectively supply power to multiple transformers when other power sources become disabled or go offline. Nor has the industry succeeded in preventing backfeed to the power grid or in allowing any DC power source connected to the converter to be charged from any of the other power sources connected thereto.

Accordingly, the industry would be benefitted by a step wave power conversion method and apparatus which provides seamless integration between multiple power sources. The industry would be further benefitted by a step wave AC output which more closely approximates an ideal AC waveform. The industry is in further need of a more efficient step wave power converter. The industry would also be benefitted by a method of converting DC voltage into three-phase power output with enhanced resolution with simpler circuitry. The industry is in still further need of a step wave power converter which allows a single power source to selectively supply power to multiple transformers when other power sources become disabled. Still further needs in the industry include preventing backfeed to the power grid and allowing any DC power source with storage capability connected to the converter to be charged from any of the other power sources connected to the converter.

SUMMARY OF THE INVENTION

According to the needs of the industry, one object of the present invention is to seamlessly integrate power from multiple power sources based on their performance characteristics.

Another object of the present invention is to produce a step wave AC output that more closely approximates an ideal AC waveform.

Another object of the present invention is to produce three-phase AC power output in a more efficient manner.

Yet a further object of the present invention is to enhance the resolution of the step wave power output from a three-phase step wave power converter without increasing the number of transformer components.

Still another object of the present invention is to selectively allow a single power source to supply power to multiple transformers when one or more other power sources become disabled.

Further objects of the present invention include preventing backfeed from the DC power buses to the input power grid and allowing any of the DC power sources connected to the converter to be charged from any of the other power sources connected to the converter.

This invention provides a significant improvement in the art by enabling an improved step wave power converter for converting DC voltage input into a step wave AC output. The step wave power converter of this invention is provided with multiple transformers configured to receive DC voltage from a plurality of power sources. Each of the transformers includes a primary winding and a secondary winding. The transformers are each configured to supply a step for a step wave AC output. Bridge circuits are supplied for controlling input of DC voltage into the primary windings of the transformers. Steps for the step wave AC output are output from the transformer secondary windings based upon the input provided to the primary windings. Source management circuitry manages which power source(s) supplies DC voltage to each of the bridge circuits. The management circuitry provides seamless power switching between the plurality of power sources based on each power source's performance characteristics. The step wave AC output can be a single- or multi-phase AC output. A pulse-width modulator can also be provided to the step wave power converter to modulate the input into a selected primary winding. In this way, the step wave AC output can be fine-tuned in substantial conformance with an ideal AC waveform.

A three-phase step wave power converter according to one embodiment of this invention includes multiple three-phase transformers. Each three-phase transformer has primary and secondary windings. The three-phase transformers are configured to receive DC voltage from one or more power sources into their primary windings and to supply one or more steps for each phase of a three-phase step wave AC output from their secondary windings. A plurality of bridge configurations or circuits are also supplied, each of which is made up of multiple gate pairs arranged in parallel. Each gate pair includes two or more gates arranged in series. Opposite ends of each of the primary windings of each transformer are connected between gates in separate gate pairs of a corresponding bridge. Each bridge circuit is thereby configured to control current flow across the primary windings of its corresponding transformer. Preferably, the transformers are arranged having a delta-wye configuration in which primary windings are coupled in a delta arrangement and secondary windings are arranged in a wye configuration. When configured in this way, the resolution of the three-phase step wave AC output can be enhanced by managing characteristics of the voltage transformation between the delta primary winding configurations and the wye secondary winding configurations.

A method for enhancing a three-phase step wave AC output from a three-phase step wave power converter is also provided. The three-phase step wave power converter has multiple three-phase transformers having primary and secondary windings, with each transformer arranged in a delta-wye configuration. The method begins by receiving one or more DC voltage inputs into the step wave power converter. Steps of the three-phase step wave AC output are generated from the secondary windings by controlling timing and sequencing of the DC voltage inputs into the primary windings. Voltage phase characteristics of the delta-wye transformation are managed to increase the number of steps in the three-phase step wave AC output.

Yet another embodiment of the invention provides a step wave power converter similar to those previously described, but which also includes cross-tie circuitry to allow one of the power sources to supply power to two or more transformers when one or more of the other power sources becomes unstable, inoperative, or goes offline. This cross-tie circuitry includes gated connections between two or more of the DC buses. Each power source can further be provided with cut-off gates to allow it to be readily disconnected from the input system(s).

A still further embodiment of a step wave power converter includes an isolation switch for isolating at least one of the power sources from the input power grid to prevent or gate backfeed to the grid. It should also be noted that isolation switches can be provided for each of the power sources, to isolate each of them from each of the other power sources as well as from the input power grid. When each of the power sources are isolated from each other, bi-directional circuitry can further be provided for allowing any of the DC power sources to be charged from any other of the power sources. Providing isolated power sources also allows DC power to be supplied by a rectified variable frequency and voltage input.

Finally, a method for enhancing the characteristics of a step wave AC output from a step wave power converter is provided in which a DC voltage is supplied to the step wave power converter. The DC voltage is transformed into a plurality of steps of the step wave AC output. Significantly, the DC input voltage is pulse-width modulated such that the step wave AC output more closely approximates an AC waveform. This method works particularly well when DC input voltages are provided to multiple transformers and when the input voltage to a selected one or more of the transformers is pulse-width modulated while holding the inputs to one or more of the other transformers in a constant on or off state. This allows fine-tuning of the step wave AC output in substantial conformity with an ideal AC waveform.

It will be readily apparent to those of skill in the art that the above described features and advantages can be combined in numerous ways not limited to those combinations explicitly described herein. Furthermore, the foregoing and other objects, features, and advantages of the invention will become more readily apparent from the following detailed description of preferred embodiments of the invention which proceed with reference to the accompanying drawings.

DETAILED DESCRIPTION

The step wave power converter (SWPC) of this invention is an innovative power converter designed around a unique platform that allows it to have a wide range of uses beyond those of conventional power converters. These uses extend beyond the usual task of converting power from a single DC source to AC power. One such use includes consolidation, integration and supervisory control of multiple power sources through a single SWPC while isolating each source so that each can operate at optimum efficiency. The power sources connected to the SWPC can include diesel or gas generators, wind turbines, solar photovoltaic (PV) cell arrays, hydro-electric generators, batteries, gas turbine generators, fuel cells, etc. Yet another use is in backup power supply systems, including integration, isolation, and management of the power sources that comprise the backup power supply system. Still another use is managing the power for power generators installed in the distributed generation mode. Another use is end of grid and in line voltage and power quality regulation. Further uses include standard 60 Hz or customized frequency regulation; the ability to feed reactive power to a grid or an off-grid load on demand; and the provision of a programmable microprocessor controller that is customized and optimized, as required, for each application.

Figure 1:
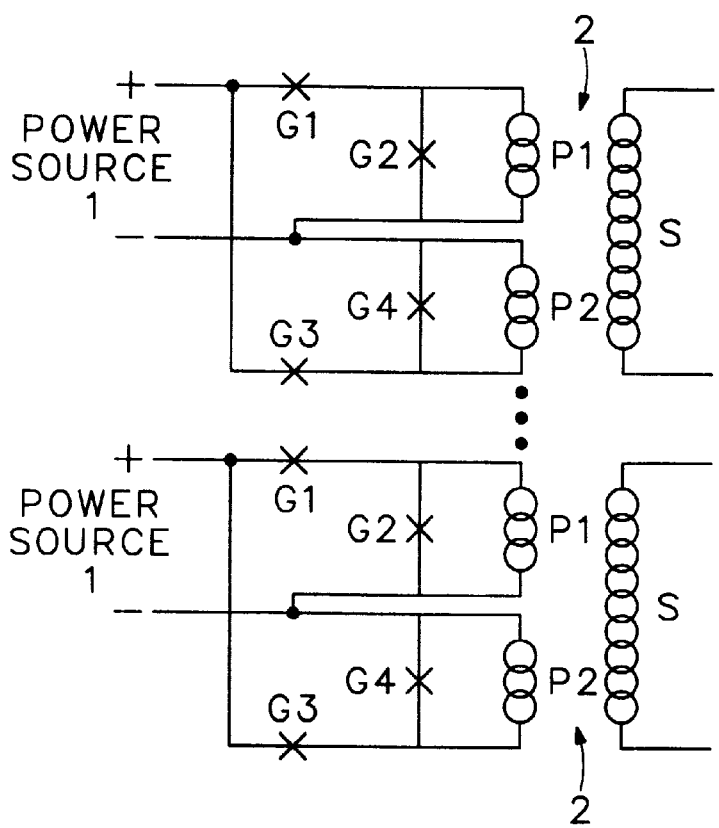
FIG. 1 is a schematic illustration of a conventional single-phase step wave power converter for converting DC voltage from a single power source into a step wave AC output.
Figure 2:
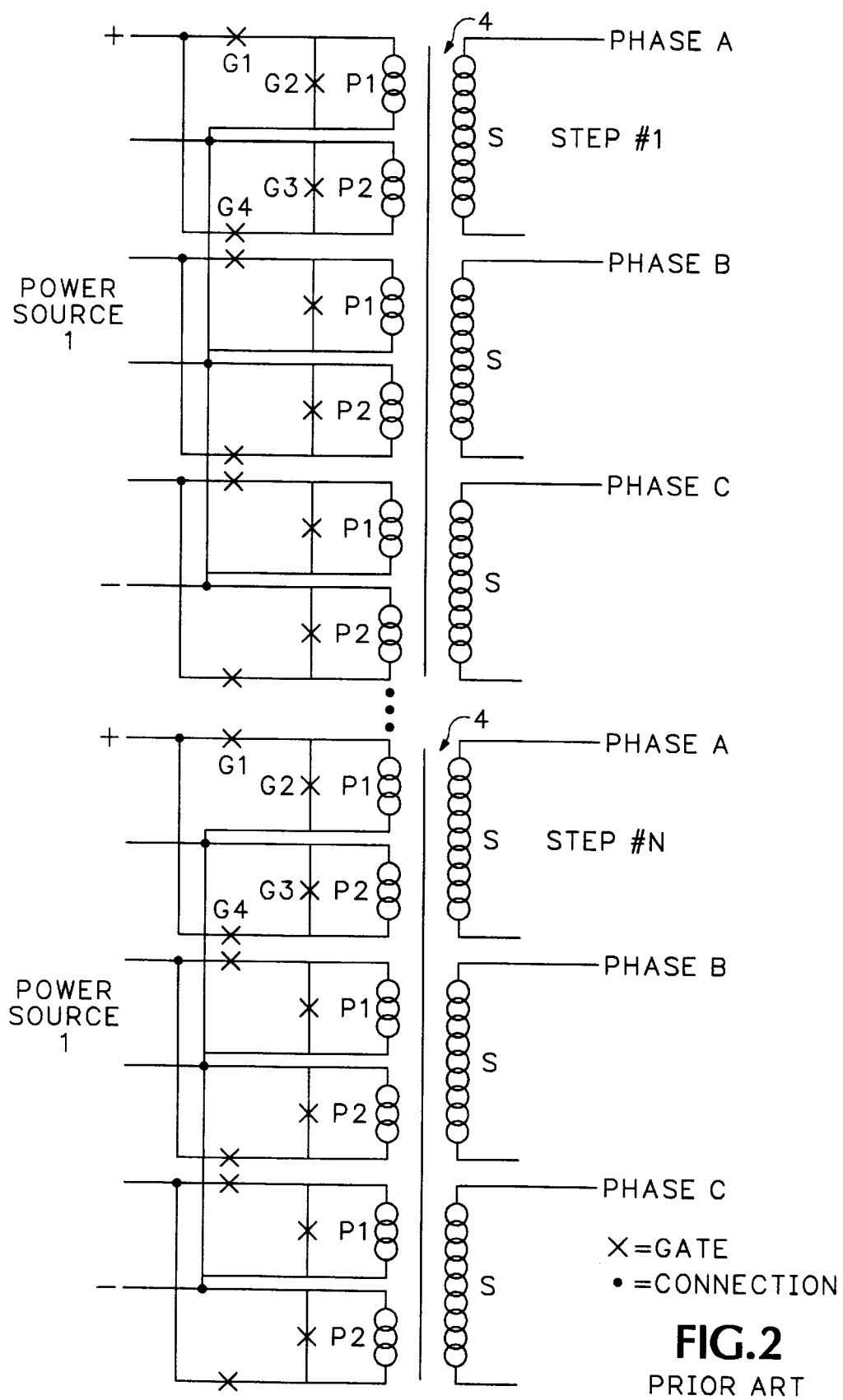
FIG. 2 is a schematic illustration of a conventional three-phase step wave power converter for converting DC voltage from a single power source into a three-phase step wave AC output.
Figure 3:
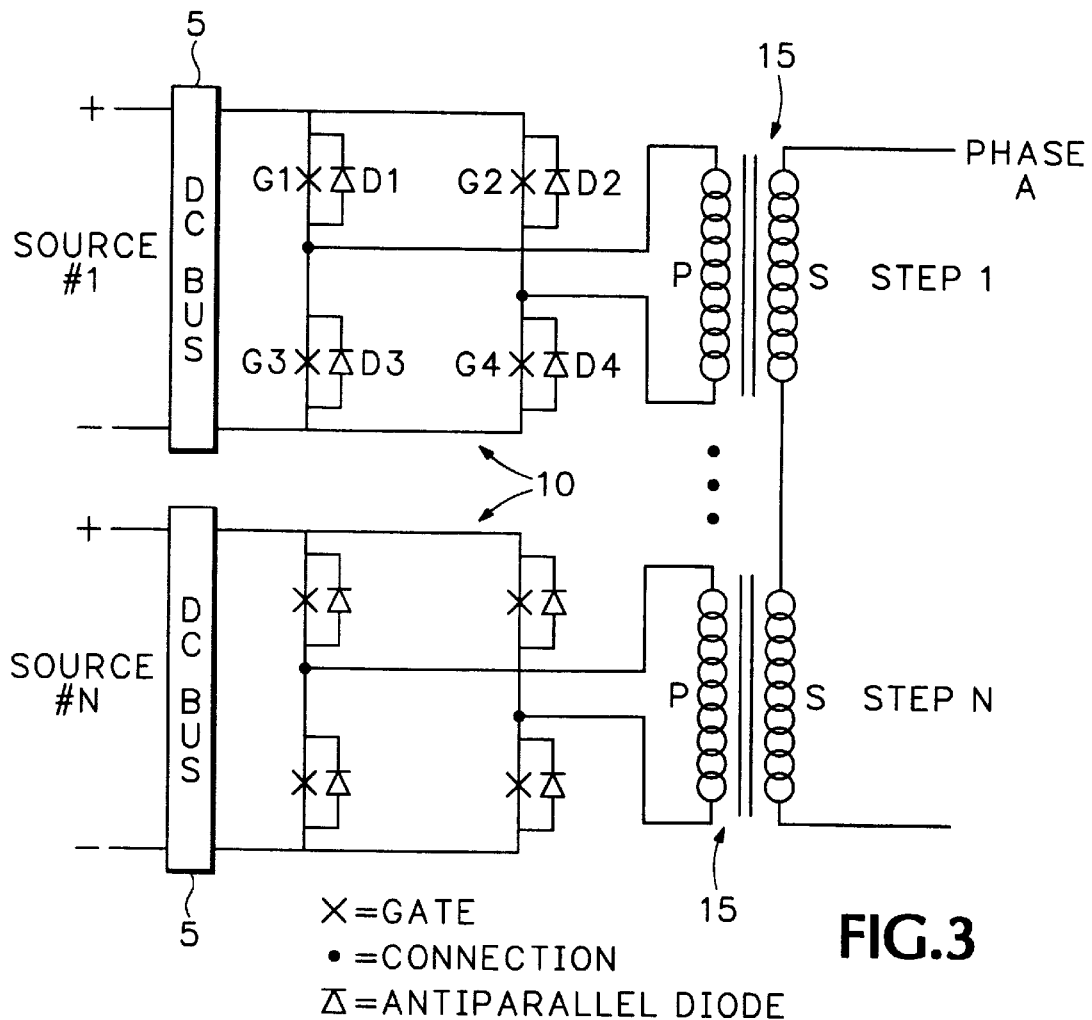
FIG. 3 is a schematic diagram of a single-phase step wave power converter configured to receive and manage DC voltage inputs from multiple power sources according to one embodiment of the present invention.

Specific embodiments of the present invention will now be described in more detail. FIG. 3 is a schematic illustration of a single-phase step wave power converter for receiving and managing DC voltage inputs from multiple power sources according to one embodiment of the present invention. According to this embodiment, DC buses 5 receive power from the power sources and supply it as a DC voltage input to one or more bridge circuits 10. Each bridge circuit 10 preferably consists of an insulated gate bipolar transistor (IGBT) module having four IGBT switching gates G1–G4, which are controlled by a driver board in response to signals from a control board. Each IGBT switching gate GI–G4 is preferably fitted with an antiparallel diode D1–D4, respectively, to allow shorting current to flow. Although IGBT switching gates are preferred, the gates can include HEXfets or other semiconductor power switching devices and a corresponding antiparallel diode. In this embodiment, a single two winding (one primary P and one secondary S) transformer 15 is used for each step.

Single-phase shorting using the four gate bridge 10 involves closing the two gates G1, G2 on the positive inputs (the positive transistors) or the two gates G3, G4 on the negative inputs (the negative transistors). Closing the gates in this manner allows shorting current to flow through one diode and one gate of a shorted transformer 15, thereby imposing a null potential across the primary winding P of the shorted transformer. Shorting is important for allowing power supplies to be dynamically added or removed from a transformer without affecting the transformer's winding ratio requirements.

Figure 4:
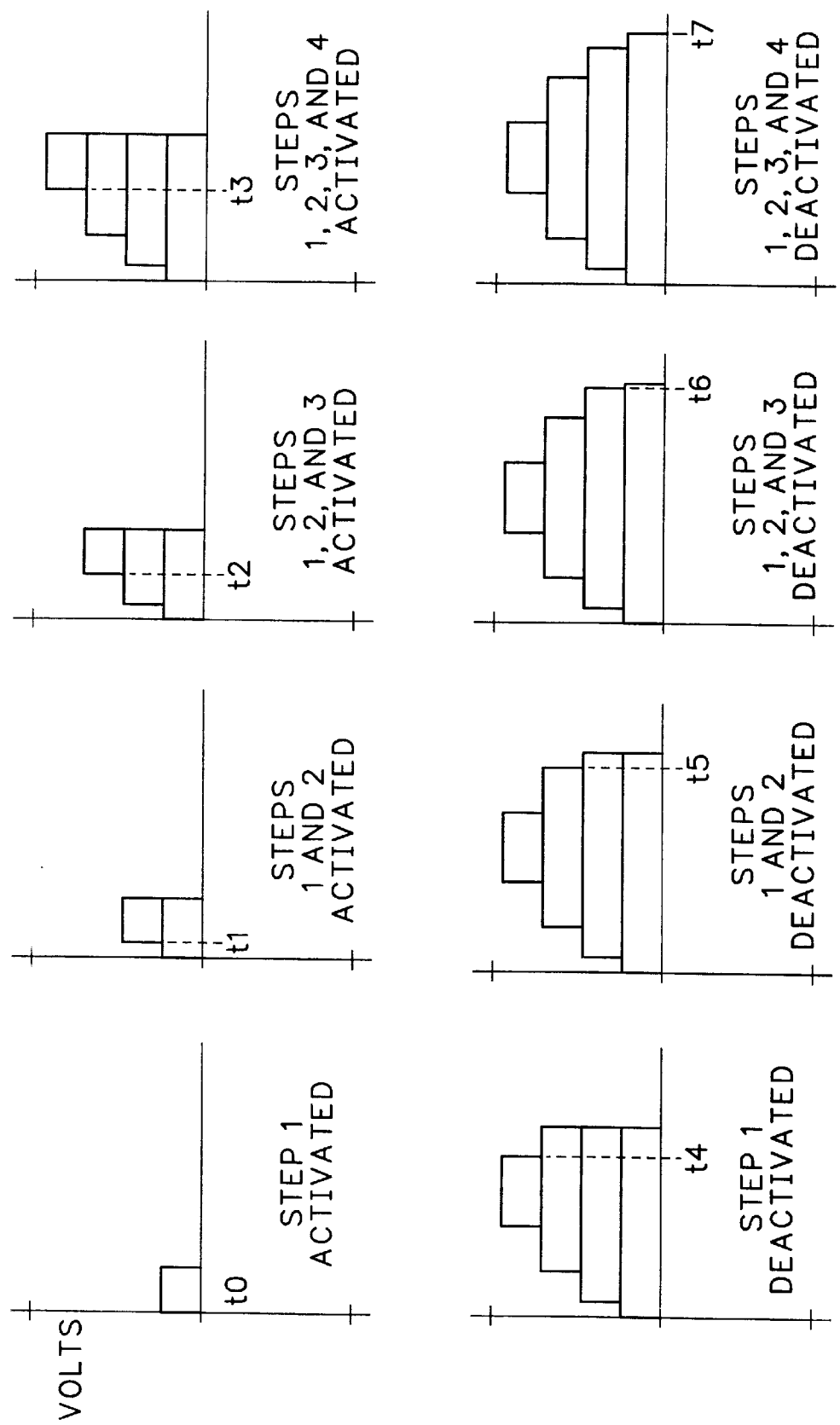
FIG. 4 is a series of graphs illustrating the generation of a single-phase step wave AC output from a step wave power converter, such as the one illustrated in FIG. 3, having four transformers.

FIG. 4 illustrates the production of a single-phase step wave AC output from a step wave power converter, such as the one described above with reference to FIG. 3. Referring now to FIG. 4, a step wave AC output is produced as follows. In a step wave power converter having four transformers, each transformer produces an output from its secondary winding according to a voltage input into its primary winding and the transformer winding ratio. Each of these outputs forms a building block, or step, of an overall AC output. The outputs from all of the secondary transformer windings are added together in series to simulate the AC sine wave.

Generally, the process for producing the step wave output proceeds by turning on each of the transformers sequentially at a specified time and then leaving them on for a given period of time before sequentially deactivating them. Specifically, this process begins by turning on a first transformer at a zero reference time t0. The activation of the first transformer activates step one of the step wave output. Step one remains activated while other steps are added. At a first point in time t1, a second transformer is turned on and its voltage output is combined with the output of the first transformer, thereby activating step two. Similarly, at a second point in time t2, a third transformer is turned on and its voltage output is added to that of the others to activate step three of the step wave output. Likewise also, at a third point in time t3, a fourth transformer is turned on to activate step four.

At a later specified time, the step wave production process is reversed to step the AC waveform back down. This is accomplished by sequentially turning the transformers off at fourth, fifth, sixth, and seventh points in time t4, t5, t6, and t7. Turning a transformer off preferably includes shorting a voltage across the primary winding of the transformer as described above. Although this reverse process can proceed by turning off the transformers in any order, a preferred method proceeds by deactivating the transformers in the order they were activated. Accordingly, the first transformer is deactivated first, the second transformer next, and so on. Specifically, step one is deactivated by turning off the first transformer at the fourth point in time t4. Step two is deactivated at the fifth point in time t5 by turning off the second transformer. Similarly, step three is deactivated at the sixth point in time t6 by turning off the third transformer. And, finally, step four is deactivated at the seventh point in time t7 by turning off the fourth transformer. By deactivating the transformers in the order they were activated, balancing of the transformer duty cycles is achieved.

Although not shown, after all of the transformers have been turned off, the waveform building process is repeated in order to build the later 180 degrees (or negative half) of the AC sine wave. The process for producing the negative half of the waveform is the same as for the positive half just described, except with negative voltage polarity.

Referring again to FIG. 3, a positive step for the AC waveform is generated by closing the first positive switch G1 and the second negative switch G4 in one of the bridge circuits. A negative step for the AC waveform is generated by closing the first negative switch G3 and the second positive switch G2 in one of the bridge circuits. A shunt of the transformer primary P is generated by closing either both positive switches G1, G2 or both negative switches G3, G4.

In summary, the steps of the simulated AC waveform of FIG. 4 are produced by sequentially enabling and disabling DC voltage input into the primary windings of multiple transformers at specified points of time. In some embodiments, each step may be formed from the voltage contributions of only one transformer. In other embodiments, however, each step may be formed from the voltage contributions of more than one transformer.

Voltage control of the step wave AC output is established by varying the number of transformers active at any given time as well as the duty cycle associated with each of those transformers. The transformers can also be sized to assure that any number less than the total number of transformers are capable of producing rated output voltage. Additionally, by adding steps and by varying the duty cycle of any given step, a wide range of output voltages can be derived. Additionally, step width can be varied to generate the proper waveform and RMS voltage.

Figure 5A:
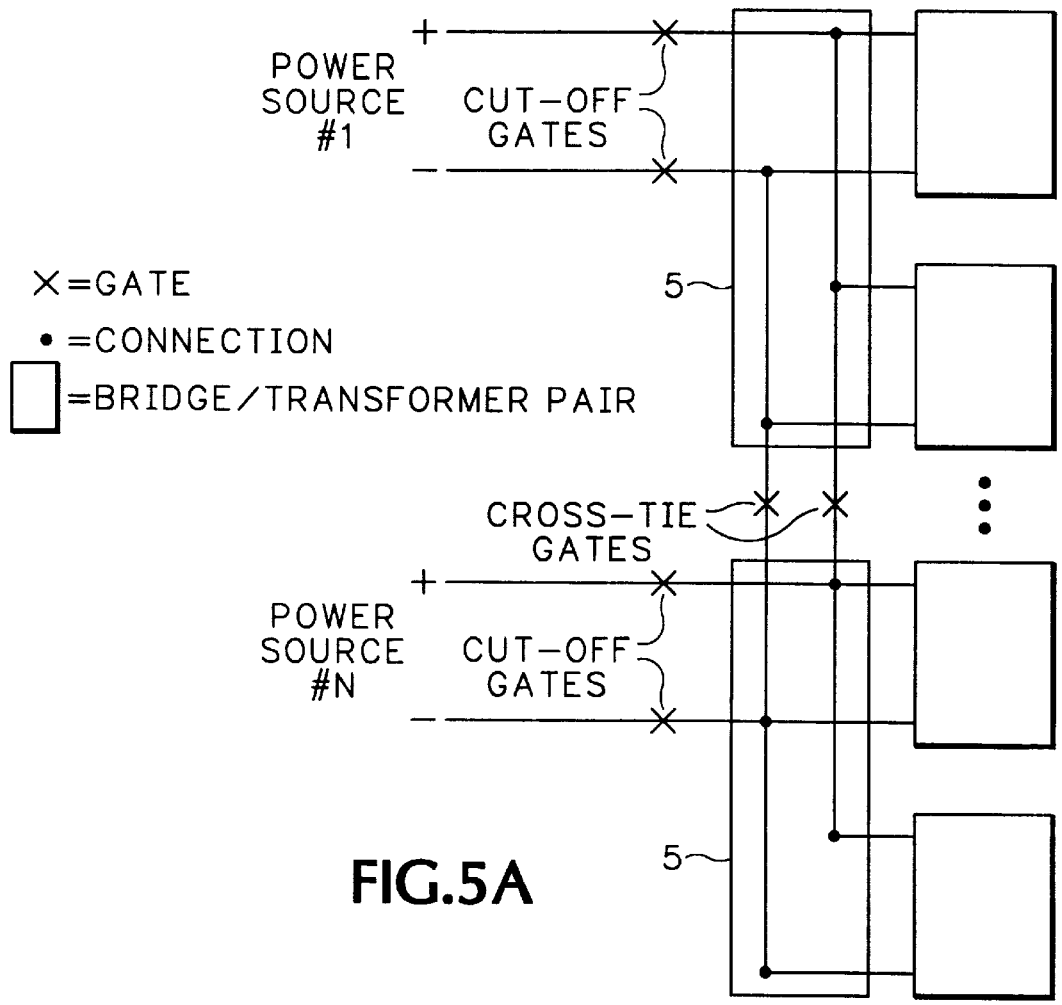
FIG. 5A is a schematic illustration of a step wave power converter, similar to the one illustrated in FIG. 3, further including cross-tie circuitry and cut-off gates for selectively providing or disabling input from one of the DC power sources to one or more transformers according to another embodiment of the present invention.

When multiple power sources are provided to a step wave power converter, it is sometimes desirable to maintain the ability to cross connect any of the power sources to any number of transformers in the converter. Consequently, according to a preferred embodiment of this invention, each power source connected to the SWPC is supplied with a bypass switch. Bypass switches allow the SWPC to switch off an abnormal power source. Bypass switches further allow the SWPC to prevent backfeed to the grid. Bypass switches can be added to any SWPC configuration by supplying cut-off gates to the power source input lines as illustrated in FIG. 5A. This allows the gating mechanism of the grid source to be blocked when needed. Another layer of protection can be achieved using the cross-tie approach described below.

FIG. 5A shows additional DC source management circuitry including a cross-tie arrangement for interconnecting multiple power sources with multiple transformers. In the cross-tie arrangement, a step wave power converter is provided with gated interconnections, called cross-ties, between DC buses 5. The gates on the interconnections are referred to as cross-tie gates. The cut-off gates described above are included on each power source's positive and negative input lines to isolate that power source from the other power sources and the grid. In normal operation, the power source cut-off gates are closed to allow power to be supplied from each of the power sources while the cross-tie gates are open to provide isolation between DC buses. When one of the power sources fails or is disconnected, however, a degrading DC bus 5 is sensed. The cut-off gates associated with the failed source then open to isolate and prevent further contribution of power from the compromised power source, and the cross-tie gates close to allow a still functioning power source to supply power to the DC bus 5 for the compromised power source. This control mode assures seamless transfer between power sources while still maintaining isolation between them. Although FIG. 5A shows only two power sources, it should be appreciated that this embodiment is scalable to include any number of power sources and cross-tie devices. Therefore, more than two sources can be added in this scheme.

An improvement in the art realized by yet another embodiment of this invention results from the provision of bi-directional circuitry between the isolated power sources. Bi-directional circuitry between isolated power sources gives the SWPC of this invention the ability to charge any of the DC sources connected to the SWPC from any of the other sources connected to the SWPC. In other words, this circuitry enables a bi-directional capability on any of the DC buses 5 but maintains their isolation from one another. For example, in a SPWC where a battery and a photovoltaic (PV) cell array comprise two of the power sources, the battery can be charged from the PV array while still maintaining the array's isolation from the battery. This is a significant innovation because the batteries can stay at a relatively constant voltage while the PV maximum power point voltage fluctuates.

A still further advantage provided by the use of isolated DC buses is the ability of the SWPC of this invention to allow variable speed operation of any combination of rotating or fixed power generation means. For example, a variable speed diesel, a variable speed windmill, and a PV array can all be run through a single SWPC when isolation is maintained between each of the DC buses. In other words, when the diesel's rectified DC bus is isolated from the rectified DC bus of the windmill and the PV array, each of the sources can operate at any desired speed or voltage level without interfering with the other sources.

Figure 5B:
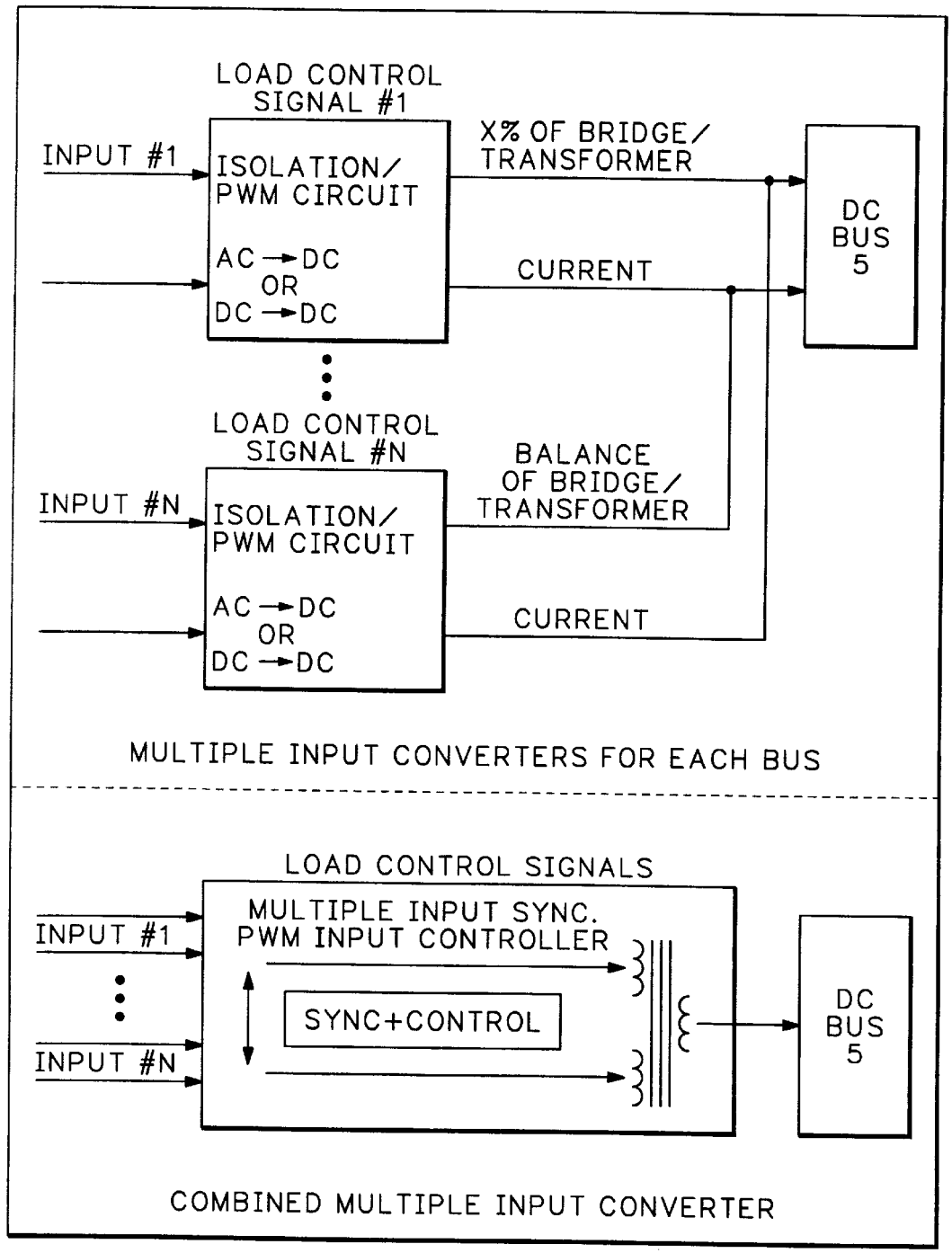
FIG. 5B is a schematic illustration of a step wave power converter, similar to the one illustrated in FIG. 3, for controlling power inputs from multiple sources according to yet another embodiment of the invention.

FIG. 5B illustrates still other embodiments of this invention which are also configured to provide multiple power source management through power source management circuitry. One such embodiment includes multiple high frequency input converters tied to each DC bus 5, while yet another includes a combined multiple input converter. By using more than one high frequency input converter tied to each DC bus 5, or a combined multiple input converter, each input may contribute as much of the power to the overall system as desired. The top circuit illustrated in FIG. 5B shows multiple high frequency input converters tied to each DC bus 5. In this embodiment, power inputs from each of the multiple power sources are run through a separate isolation circuit which can also contain pulse width modulation circuitry. One of the input power sources, i.e., Input #1, can be an input power grid. The outputs from all of the isolation circuits are combined together and supplied to the DC bus 5. Each DC bus 5 can then be used to supply power to a transformer. The transformer would receive DC voltage input from the DC bus, which receives power from one or more power sources, including the input power grid, through the isolation circuit. The isolation circuit can thereby isolate the DC bus from the input power grid to prevent backfeed to the grid from the DC bus.

The circuit illustrated at the bottom of FIG. 5B illustrates a combined multiple input converter tied to a DC bus 5. In this converter, multiple high frequency DC/DC, PFC, and AC/DC converter inputs from multiple sources may be converted to a common DC bus 5. By 13 providing proper feedback control, each input can supply a regulated portion of the power used in the inverter. The portion of the power supplied by each input can be adjusted by the control board. This feature can also be incorporated into a single, high frequency converter circuit, with multiple inputs, that synchronizes control and reduces components.

Multiple power source management is particularly beneficial where some or all of the power sources produce non-uniform power outputs, such as photovoltaic cells, windmills, etc. According to this invention, such sources could be used to provide a large amount of the power when their strength is high, but be used to supply less of the power as they weaken. The control signal for each input converter will determine the amount of power transferred from each power source. This embodiment thereby facilitates "soft" transfers between input sources. Unlike "hard" power transfers, where a power source is either connected to or disconnected from the system, "soft" power transfers allow each power source to contribute a desired percentage of the power to each of the transformers. Also, this invention allows power sources to be slowly ramped-in or ramped-out when being connected to or disconnected from the system, helping to prevent voltage spikes and provide a more uniform power supply. These types of multiple power source control can be utilized with either single-phase or three-phase power converters.

Figure 6:
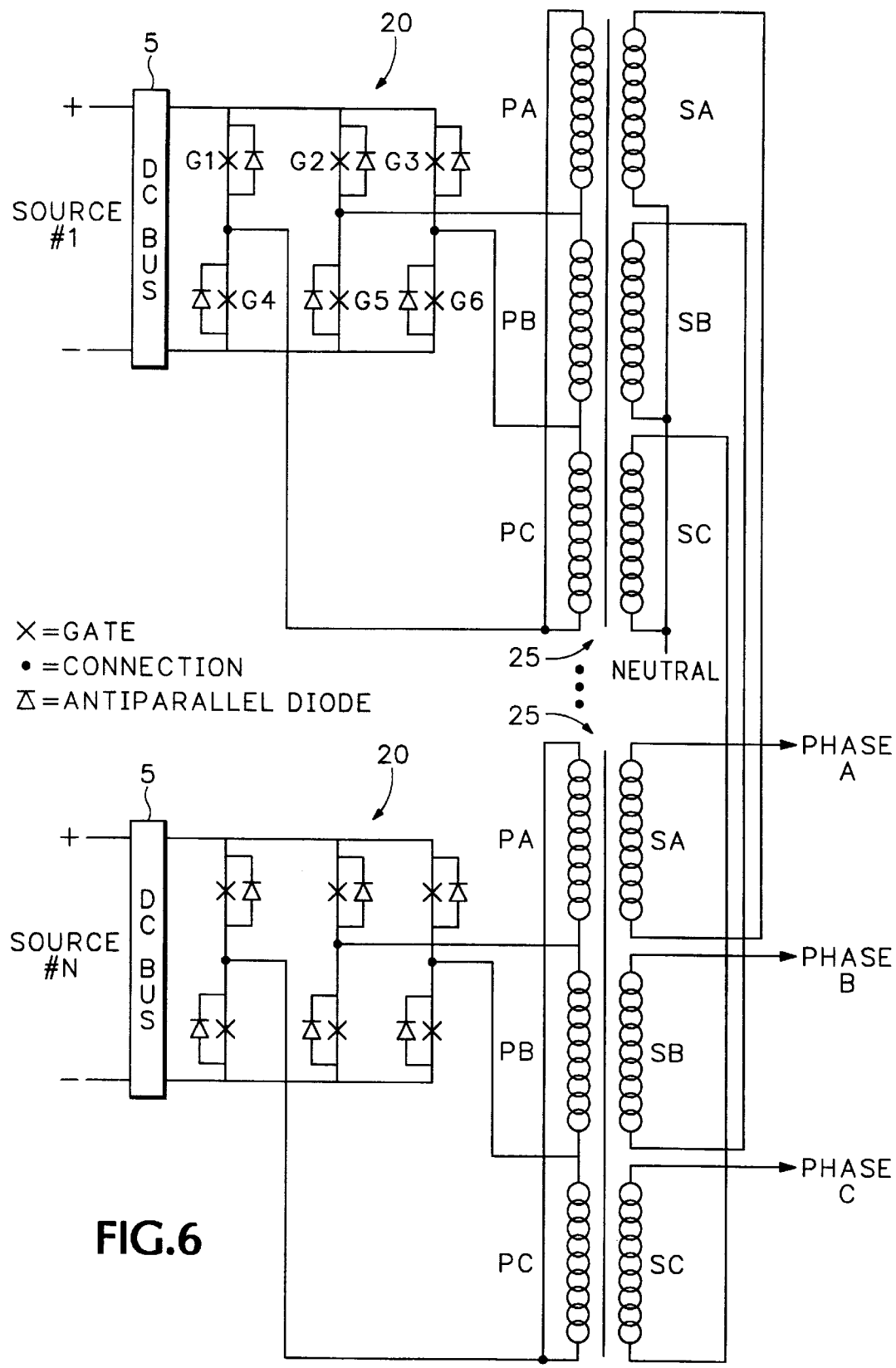
FIG. 6 is a schematic illustration of a three-phase step wave power converter according to yet another embodiment of the present invention, showing an improved bridge arrangement and delta-wye transformer configurations.

Still another embodiment of this invention provides improvements in the art specifically with respect to three-phase step wave power converters. This embodiment is the unique SWPC configuration shown in FIG. 6. FIG. 6 is a schematic illustration of a three-phase step wave power converter including an improved bridge architecture 20 and delta-wye transformers 25. Specifically, this embodiment utilizes a unique step wave power converter topology consisting of multiple three-phase transformers 25, each arranged with primary windings PA, PB, PC in a delta configuration and secondary windings SA, SB, SC in a wye configuration. Voltage flow across the primary windings PA, PB, PC of each transformer is controlled by six gates G1–G6 configured in a bridge circuit 20. One or more power sources can be used to supply power to the bridge circuits 20 through their respective DC buses 5. Each of the gates G1–G6 in a bridge circuit 20 includes an insulated gate bipolar transistor (IGBT) fitted with an antiparallel diode to allow shorting current to flow. A primary benefit of this new topology is that it requires only six gates G1–G6 and one three-phase transformer 25 per step (having only one primary and one secondary winding per phase) rather than the nine or twelve gates and the more complex transformer configurations of the prior art.

As mentioned above, the connections between the primary windings of each of the three-phase transformers 25 in this embodiment are arranged in a delta configuration. Each three-phase transformer 25 includes a single primary winding PA, PB, or PC and a single secondary winding SA, SB, or SC for each phase. In the delta configuration, a first end of a phase A primary winding PA and a second end of a phase C primary winding PC of one transformer 25 are coupled together and connected to that transformer's bridge circuit 20 between two gates G1 and G4 in a first series connected gate pair. Similarly, a second end of the phase A primary winding PA and a first end of the phase B primary winding PB are coupled together and connected to the bridge circuit 20 between two gates G2 and G5 in a second series connected gate pair. Finally, a first end of the C phase primary winding PC and a second end of a B phase primary winding PB are coupled together and connected to the bridge circuit 20 between two gates G3 and G6 in a third series connected gate pair. The secondary windings SA, SB, SC of each three-phase transformer 25 are arranged in a wye configuration, with all of the secondary windings SA, SB, or SC of the same phase being connected together in series.

Operation of the three-phase transformers 25 using the six gate bridge 20 will now be described in more detail. Voltage across the primary windings PA, PB, PC of the transformers is controlled to induce the steps of the AC waveform output for each phase A, B, C through the corresponding secondary windings SA, SB, SC. Each of the transformers 25 directly contributes one step to the AC output of each phase. Specifically, when a voltage is applied across a transformer's primary winding corresponding to one of the phases, the corresponding secondary winding produces a step for that phase of the AC output. Furthermore, similar to the single-phase embodiment, a voltage is shorted across one or more of the primary windings of the three-phase transformer 25 in order to shunt them. Three-phase shorting (i.e., shorting of all three phases) using a six gate bridge 20 involves closing the three positive transistors G1–G3 or the three negative transistors G4–G6. Closing either set of three gates allows shorting current to flow through a combination of diodes and gates so that a null potential is imposed across all three primary windings PA, PB, PC of the shorted transformer.

Furthermore, each of the primary windings PA, PB, PC of the transformer 25 may have a potential or be shunted at different times based upon the operation of the six gates G1–G6. For instance, the phase A primary winding PA will be on when either of two sets of gates G1, G5 or G2, G4 are closed. Positive polarity voltage is applied across the phase A primary winding PA when a first positive gate G1 and a second negative gate G5 are closed. Conversely, reverse polarity voltage is applied to the phase A primary winding PA when a second positive gate G2 and a first negative gate G4 are closed. Phase A is shorted and turned off, however, when either the two positive gates G1, G2 or the two negative gates G4, G5 connected to opposite ends of the phase A primary winding PA are closed. Similarly, the phase B primary winding PB will be on when either of two sets of gates G2, G6 or G3, G5 are on. Positive polarity voltage is applied across the phase B primary winding PB when the second positive gate G2 and a third negative gate G6 are closed. Reverse polarity voltage is applied across the phase B primary winding PB when a third positive gate G3 and the second negative gate G5 are closed. The phase B winding PB is turned off when either the two positive gates G2, G3 or the two negative gates G5, G6 connected to its opposite ends are closed. Phase C is again similar. Positive polarity voltage is applied across the phase C primary winding PC when the third positive gate G3 and the first negative gate G4 are both closed. Reverse polarity voltage is applied across the phase C primary winding PC when the first positive gate G1 and the third negative gate G6 are closed. Finally, the phase C primary winding PC is turned off when either the two positive gates GI, G3 or the two negative gates G4, G6 connected to its ends are closed.

It should be appreciated that the gates G1–G6 may be controlled in any number of combinations in order to produce the desired steps for each phase. Accordingly, by controlling the six gates G1–G6 of the bridge circuit 20, voltage of either positive or negative polarity or a null potential can be applied across the primary windings for each phase. In this way, the desired contribution to the overall AC waveform can be output from the phase's corresponding secondary winding based on control of the bridge circuit 20.

Figure 7A:
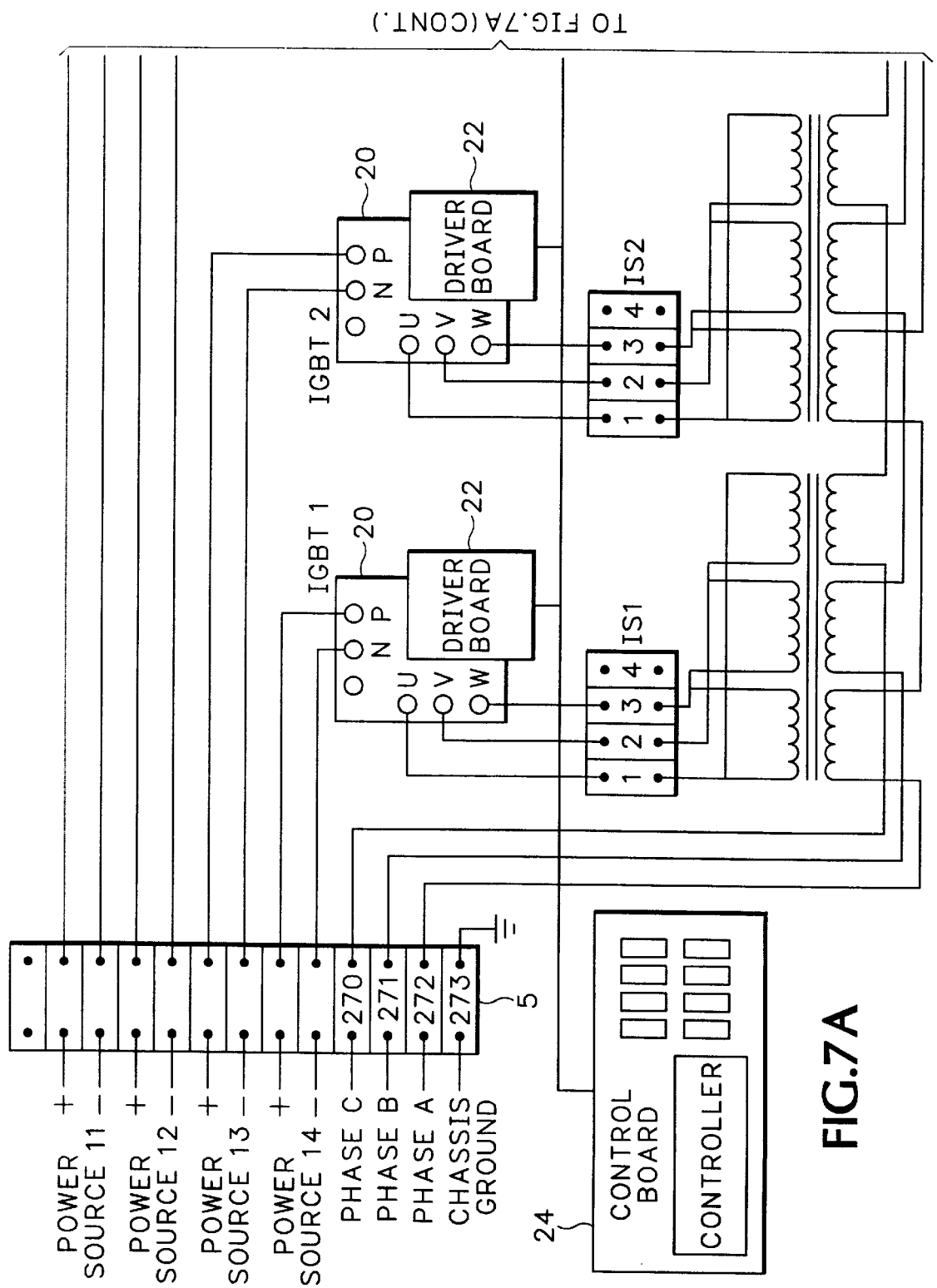
FIG. 7A is a more detailed schematic illustration of the three-phase step wave power converter according to FIG. 6, further showing insulated gate bipolar transistor (IGBT) modules containing bridge circuitry, driver boards for driving the bridge circuitry, control boards for controlling the driver boards, and series connections between secondary windings of the transformers for each phase, among other things.
Figure 7B:
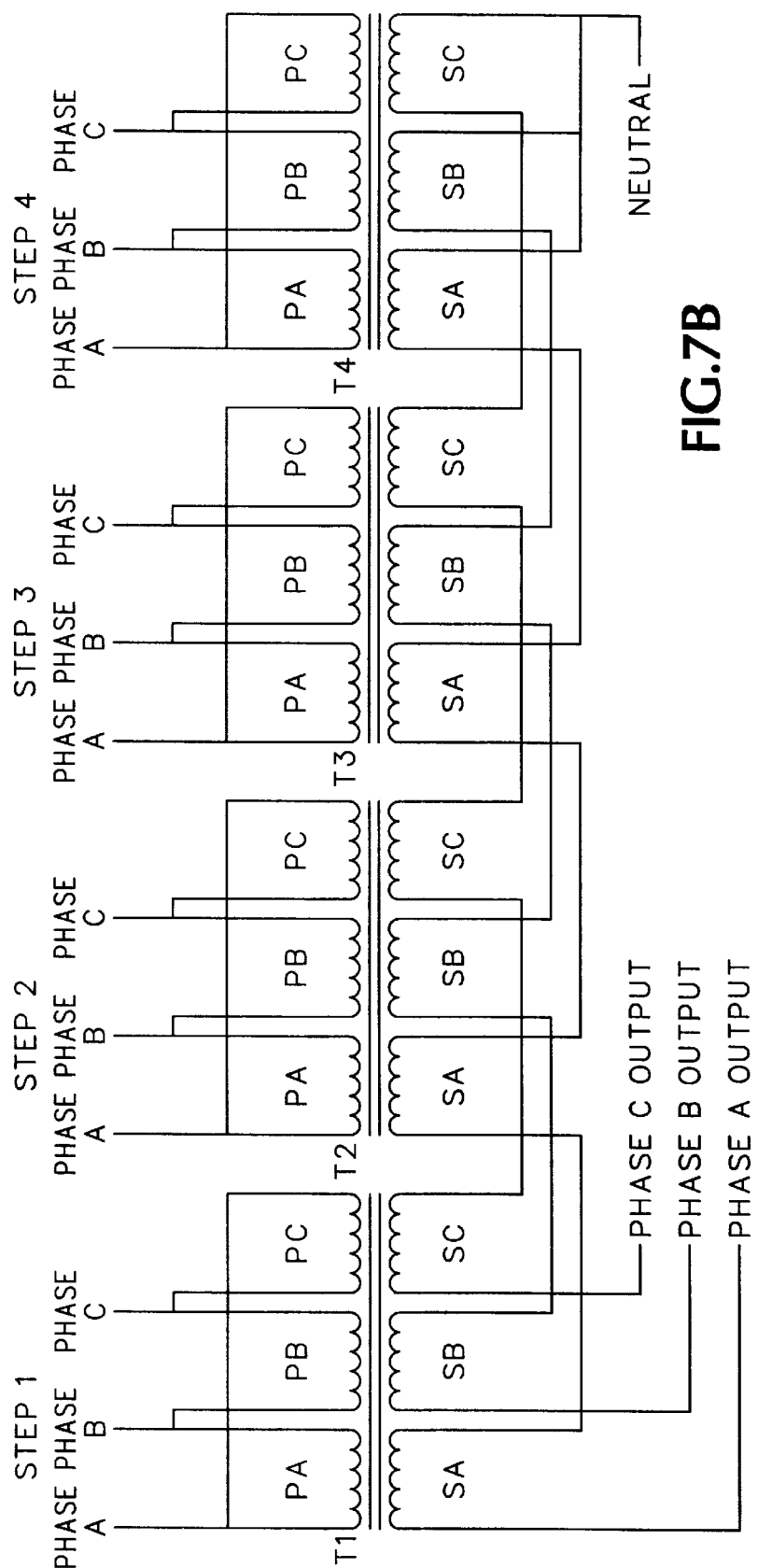
FIG. 7B is an enlarged view of the transformer configuration of the converter in FIG. 7A.

FIG. 7A is a detailed schematic illustration of a three-phase step wave power converter (SWPC), such as the one described above with reference to FIG. 6. FIG. 7B is an enlarged view of the transformer arrangement of the SWPC of FIG. 7A. Referring to FIG. 7A, IGBT modules provide the bridging circuitry 20 for control of DC power into the primary transformer windings of three-phase transformers. Power is supplied from a power source to DC buses 5. The DC buses 5 supply DC voltage input to terminals N and P of each IGBT module 20, where terminal N is the DC negative terminal and terminal P is the DC positive terminal. Each of the IGBT modules 20 produces three separate outputs A, B, and C from its three output terminals U, V, and W. These outputs are the building blocks for the A, B, and C phases of the three-phase AC output.

In this embodiment, four IGBT modules 20 are used to control when DC voltage inputs are supplied to the primary transformer windings of four three-phase transformers 25 to produce the steps (or building blocks) for each of the three phases. Of course, more or fewer than four IGBT modules 20 and transformers 25 could be used. The ratio between IGBT modules 20 and transformers 25 is typically one to one. Each three-phase transformer 25 includes three primary windings and three secondary windings (one of each for each phase). Also, in this embodiment, each IGBT module 20 is supplied power from a single, separate DC power bus 5, each of which is connected to its own power source (Power Sources 1–4). It should be appreciated, however, that any number of power sources may be connected to any one or more of the DC buses 5, as has been described above with respect to other embodiments of the invention.

The IGBT modules 20 regulate the flow of current from their DC bus 5 across the primary windings of their corresponding transformers 25 in order to produce the steps of the three-phase AC waveform. The four IGBT modules 20 are each controlled by one of four driver boards 22 that are, in turn, controlled by a control board 24. More specifically, a control algorithm, resident on the control board 24, controls signals sent to each of the four driver boards 22 that, in turn, send signals to activate the gates inside of each of the four IGBT modules 20 at the appropriate times. The control algorithm thereby controls the activation of the IGBTs in a desired sequence to produce the step wave AC output.

Referring now to FIG. 7B, outputs A, B, and C from the IGBT modules 20 are fed to the primary windings PA, PB, PC of their corresponding three-phase transformers T1–T4 to control voltage therein. Each transformer T1–T4 directly produces a single step for each phase from its secondary windings SA, SB, SC based on current flowing through its corresponding primary windings PA, PB, PC. The four transformers T1–T4 are configured having secondary windings of the same phase connected together in series. The three phases are also connected into a wye configuration on each of the secondaries.

Figure 7C:
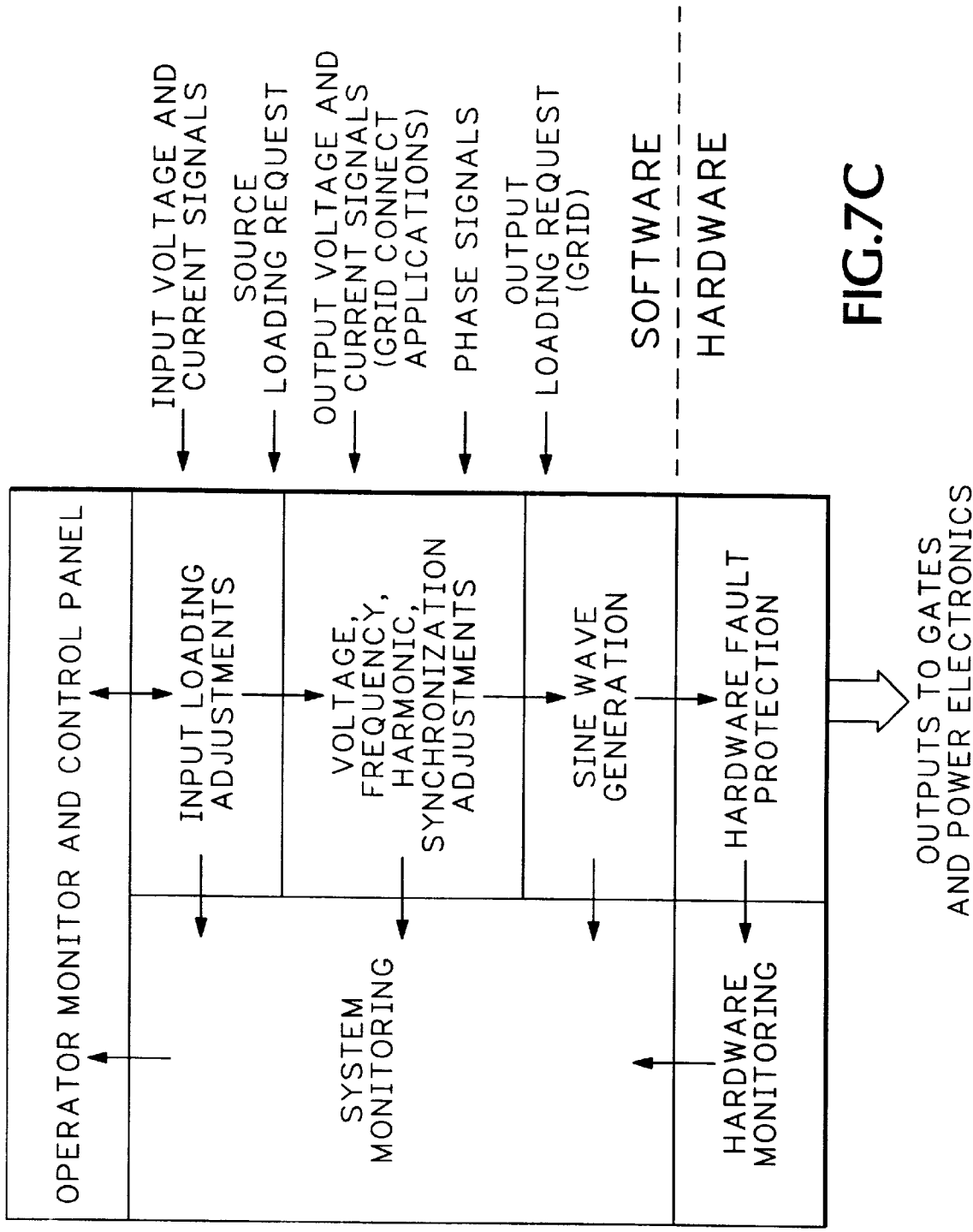
FIG. 7C is a block diagram of a control board having both software and hardware components for controlling the step wave power converter of FIG. 7A according to a preferred embodiment of the present invention.

As mentioned above, the three-phase step wave power converter of this embodiment has control circuitry including three types of control devices, as shown in FIG. 7A. The control board 24 has all programmed information and is the heart of the control system. The driver boards 22 are an interface between the control board 24 and the IGBT modules 20. The IGBT modules 20 are the power electronics that allow the electrical side of the step wave power converter to operate. The IGBT modules 20 are preferably commercially available Powerex six pack modules made by Powerex Intellimod and are unmodified from their original condition. The driver boards 22 are generally known to those skilled in the art. The control board 24 is being designed and built specifically for use with the single- and three-phase step wave power converters of this invention, a schematic representation of which is shown in FIG. 7C. Resident on the control board 24 is the micro-controller chip that is used to control all aspects of the step wave power converter. The software in the control board 24 enables the unique switching aspects of the invention.

The control board software manages the operation of the entire SWPC. It controls the operation of all of the IGBT switches within each of the IGBT modules 20 that in turn characterize the AC waveform. The proper timing for operating each of the switches in each IGBT module 20 is crucial to generating acceptable AC power quality. The software also provides features such as the ability to maintain loading for individual input sources; control of AC output voltage and current; phasing and grid synchronization; the ability to monitor and isolate gates and or gate driver logic failures; the ability to skew step wave timing to reduce harmonic distortion; step wave/pulse-width modulation (PWM) hybrid control; the ability to combine multiple inputs with different voltages and ratings; the ability to provide feedback to power sources to allow following of output loading; and the ability to allow heavy loading of single inputs, such as batteries, for a short period of time during transient conditions to allow for sources with a slower reaction time to pick up loads. Although the foregoing and other features are preferably implemented by software, it should be noted that some or all of these aspects of the invention may be performed in analog circuitry rather than by software.

In a basic three-phase step wave power converter, each phase of the AC waveform can be constructed in the same way as was described previously with respect to the single-phase step wave AC output shown in FIG. 4. Although the basic stepping procedure works very well with the single-phase power converter, however, using it directly on the three-phase power converter of this invention produces contention because of the delta-wye configurations of the gates and transformers. This contention is very detrimental to the AC power output quality. Remarkably, however, in the three-phase delta-wye configuration, the timing of the IGBT switches can actually be controlled in such a way (i.e., to adjust phase shift instead of step width) that the transformer phase shift is used in a constructive, rather than a destructive, manner. A phase management controller, such as the control board 24, may be used to control the switches to use transformer phase shift constructively.

Therefore, although the arrangements of the primary and secondary windings of three-phase transformers can be configured many different ways, it becomes advantageous in this invention to configure the primary windings in a delta arrangement and the secondary windings in a wye arrangement. Specifically, this delta-wye arrangement, when properly controlled, allows the resulting step wave to be made to contain n+2 steps, where n is the number of transformers involved in producing the AC waveform. The AC waveform thus produced includes additional steps caused by the addition of three phase-shifted primary waveforms.

Figure 8:
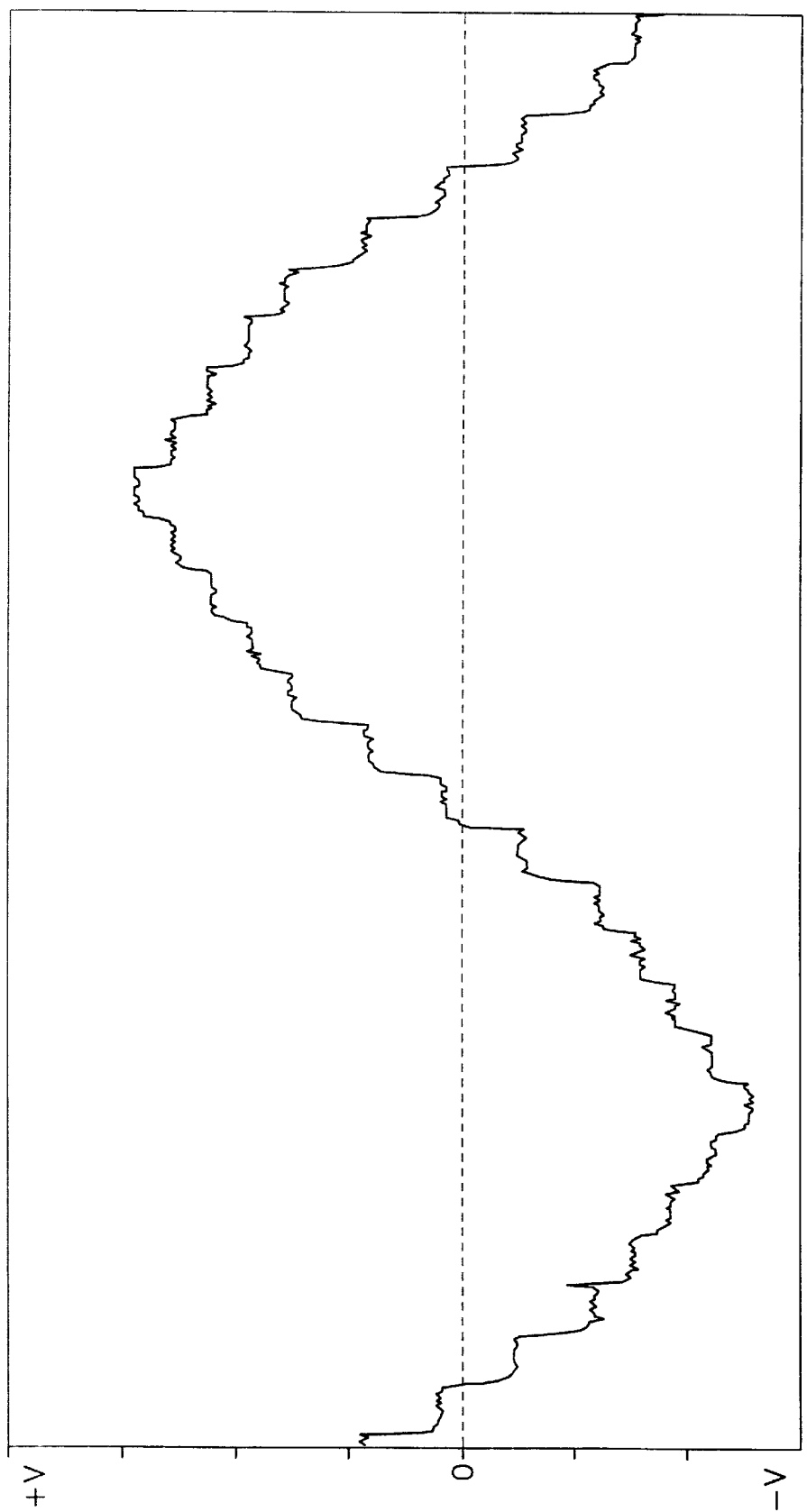
FIG. 8 is a voltage versus time graph showing a step wave AC output from a delta-wye three-phase step wave power converter similar to FIG. 8A but having enhanced resolution resulting from careful control of voltage characteristics in the delta-wye transformers.

FIG. 8 is a voltage versus time graph showing an enhanced step wave AC output produced by carefully controlling the IGBT switches to use phase shift between delta and wye transformer winding configurations constructively. As shown, constructive use of transformer contention can provide a six step waveform using only four transformers, rather than the conventional four step waveform.

To obtain the improved results described above, the invention provides a unique method for controlling the IGBT switches that allows the three-phase step wave power converter to produce an AC output voltage with higher resolution. This higher resolution includes an increased number of output voltage steps while using the same number of IGBT switches and transformers. This unique control method combines the normal phase shift combinations in the delta-wye transformer configuration with smart transformer phase shift control logic to reduce harmonics. In other words, by intelligently activating and deactivating the switches on the IGBT boards according to the natural delta-wye phase response, the step wave power converter of this embodiment provides an enhanced step wave AC output signal.

As discussed previously, use of conventional step wave switching algorithms to produce a simulated AC output is well-known. It is also quite common for conventional inverters to utilize a pulse width modulation (PWM) switching algorithm to approximate a sine wave. PWM refers to the change of the on and off times (duty cycle) of pulses, such that the average voltage is the peak voltage times the duty factor. In such PWM inverters, a sine wave is approximated using a series of variable-width pulses. None of the prior art power converters, however, have combined a step wave output with PWM. A significant improvement in the art is provided by this invention through a novel combination of step wave power conversion and PWM.

Fortunately, both step wave and PWM processes can cycle power sources in any sequence as well as control individual input source loading. Several advantages therefore result from the combination of these two approaches. These advantages include, among other things, closer approximation to a sine wave than with either of the prior art approaches alone, fewer losses than in conventional pulse-width modulation approaches, elimination of the need for rapid switching of full line voltage, and greater adaptability of the AC waveform output.

Figure 9:
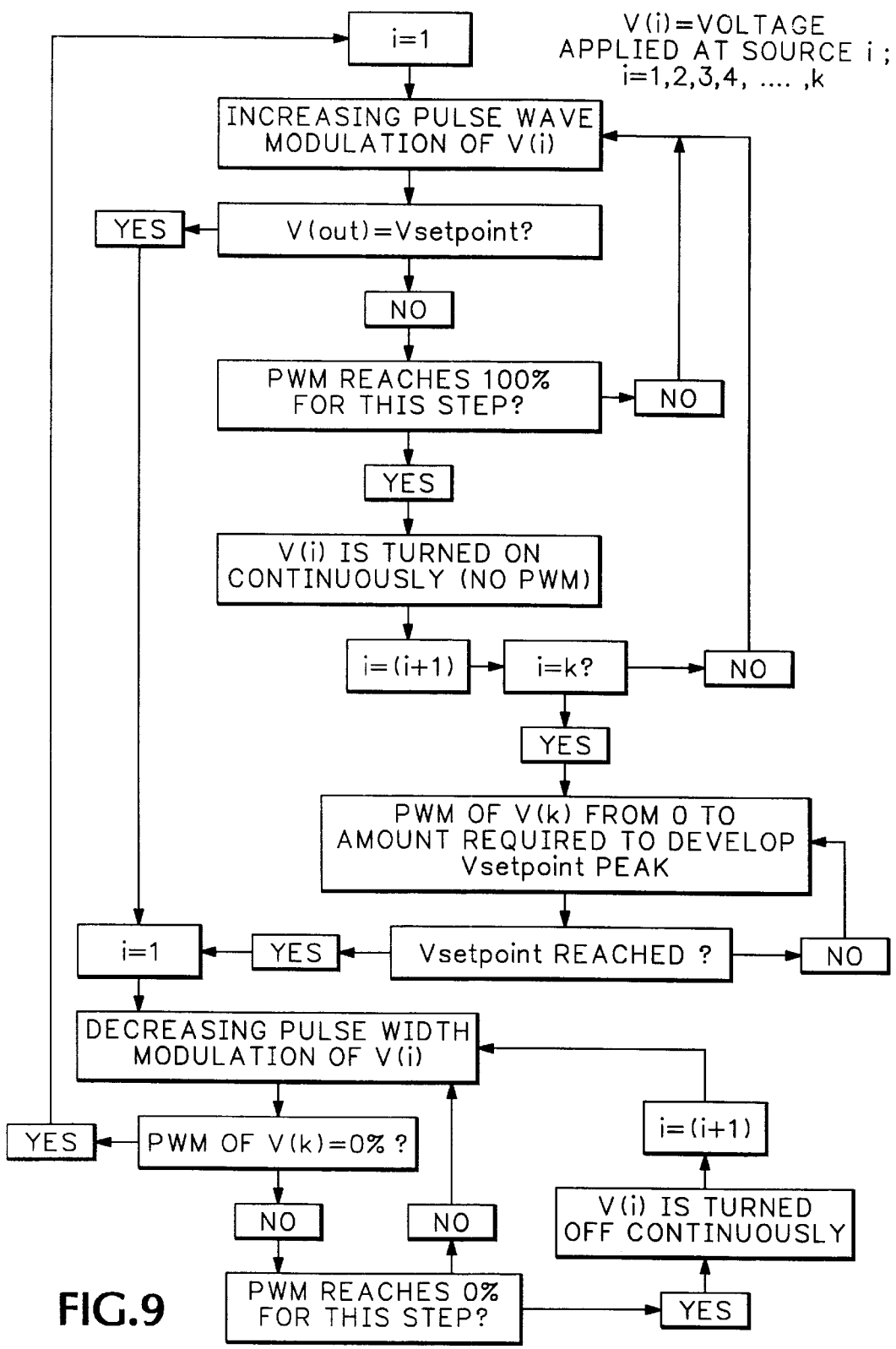
FIG. 9 is a flow chart illustrating a method for more accurately approximating an ideal AC waveform using a hybrid of step wave power conversion and pulse-width modulation according another embodiment of the invention.

Accordingly, still another preferred embodiment of this invention utilizes a unique combination of step wave and PWM algorithms to generate a hybrid step wave/PWM AC output that very closely approximates an ideal AC sine wave (i.e., potentially less than 2% total harmonic distortion). FIG. 9 is a flow diagram of a preferred algorithm for combining PWM with step wave power conversion. This flow chart illustrates a process for creating a hybrid step wave/PWM waveform that closely approximates an ideal AC waveform. It should be noted that this algorithm can be incorporated as firmware on a micro-controller with supporting analog circuitry or it can be completely analog or completely micro-controller based.

Generally, according to this novel approach, PWM is used to improve the transition edges of each step of a step wave AC output. The hybrid step wave/PWM system uses a pulse-width modulator to modulate the power input into a selected one of the transformers while inputs into the other transformers are held in a steady on or off position, to maintain the basic steps of the AC step waveform. PWM waves are thereby used in the step wave transitions to refine the envelope of the simulated AC waveform. These smaller PWM pulses can be filtered to help produce a well regulated sine wave that has very little harmonic distortion. In this way, the step wave process is used to approximate an AC sine wave on a large scale while the PWM process provides higher refinement to the sine wave approximation. The combination of using PWM for one or more transformers while using step wave power conversion technology for others is unique.

Figure 10:
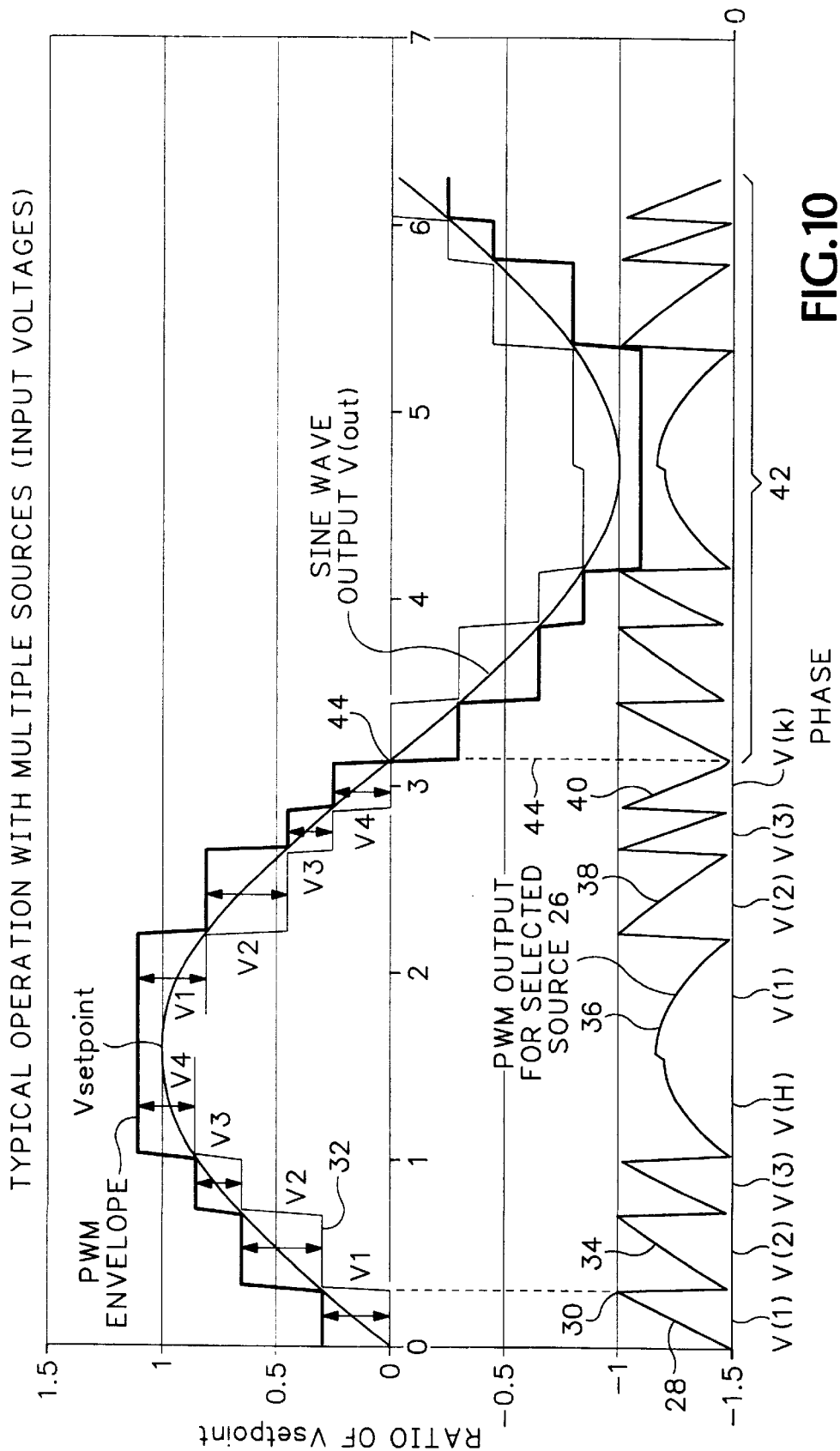
FIG. 10 is a voltage ratio versus time graph illustrating operation of the hybrid step wave and pulse-width modulation power conversion method of FIG. 9.

FIG. 10 is a graph that further illustrates the hybrid process for creating an AC waveform as described above using the algorithm of FIG. 9. The vertical axis of the graph represents the ratio of the total voltage output V(out) from series combined secondary transformer windings of the SWPC to a peak voltage Vsetpoint of an ideal sine wave. The horizontal axis is a time axis. The bottom graph represents the PWM output supplied to a selected primary winding of one of the transformers. Generally, as illustrated by the graph of FIG. 10, the hybrid step wave/PWM approach works by adding the step waves together to generate a rough estimate of a sine wave while pulse-width modulating voltage input signals during transitions to smooth the edges of the steps.

Referring to FIGS. 9 and 10, the hybrid step wave/PWM algorithm will now be described in detail. First, however, the parameters of the algorithm need to be defined. V(i) is used to represent the voltage applied at a primary winding i, where i=1, 2, 3, 4, . . . , k; and where k represents the total number of transformer primary windings used in generating the AC waveform. As noted previously, V(out) represents the combined output voltage from the series connected secondary transformer windings and Vsetpoint indicates the maximum voltage level of an ideal AC waveform. The PWM envelope represents the limits within which the PWM operation takes place, such that the unfiltered pulses are bound by the PWM envelope.

When the hybrid step wave/PWM process begins, the combined output voltage V(out) is at zero and the parameter i is set to 1. PWM of a DC input voltage V(1) into a first primary winding of a first transformer therefore begins. Accordingly, the input voltage V(1) begins to be gradually supplied to the first primary winding, such that the first transformer is turned on. As the voltage V(1) supplied to the first primary winding is modulated and filtered, it gradually increases, as shown by the PWM output graph 26 at the bottom of FIG. 10. The output voltage from the first transformer's secondary winding and the combined output voltage V(out) increase correspondingly. This input voltage V(1) is continuously modulated as shown by signal 28 until the PWM level reaches 100% for that step at time 30. Once PWM for that step reaches 100%, the input voltage V(1) into the first primary winding is continuously turned on, as represented by line 32, and the parameter i is then incremented by one so that an input voltage V(2) into a second primary winding of a second transformer can then be modulated, as represented by signal 34.

The PWM process described above is repeated for the voltage inputs to each of the primary windings until the last required primary winding k is reached. When this occurs (i.e., when i becomes equal to k), pulse width modulation of the input voltage V(k) into the final primary winding begins and continues until the overall output voltage V(out) becomes equal to the maximum voltage Vsetpoint of the ideal AC waveform. When the output voltage V(out) reaches this point, it is at its maximum desired value and must therefore begin to be decreased. To decrease the output voltage V(out), i is reset to 1 and the PWM process is reversed.

It should be noted that during modulation of each of the voltage steps, the combined output voltage level V(out) is continuously tested to see if it has reached its maximum desired value Vsetpoint. As long as the output voltage V(out) remains below the maximum, however, PWM of the current step continues until it reaches 100% for that step, as described above. When the voltage output level V(out) reaches its maximum desired value, i is reset to 1 and the PWM process is reversed so that the voltage can be gradually reduced, whether or not all of the primary windings have been used.

The PWM process continues by gradually reducing PWM of input voltage V(1) to zero, as represented by signal 36. Once PWM reaches 0% for that step, its input voltage V(1) is turned off continuously and i is incremented by one so that the input voltage V(2) into the second primary winding can be modulated, as represented by signal 38. This process continues for the voltage inputs for each of the primary windings 1–k as they are each gradually reduced to zero. After PWM of the final input voltage V(k) (signal 40) has been completed and the voltage output V(out) is zero (at time 44), the parameter i is again reset to 1. The entire process then repeats, except this time with negative polarity as shown in 42.

As a result of the hybrid step wave/PWM process described above, it is believed possible to create a simulated AC waveform with less than 2% total harmonic distortion. This invention therefore provides a significant improvement in the art by enabling a SWPC which produces a simulated AC waveform which very closely approximates an ideal AC waveform.

A few specific applications for this invention will now be described further. One specific application for the use of an SWPC having multiple, controllable, isolated source inputting is in hybrid renewable power systems. SWPCs of this invention can seamlessly and efficiently integrate renewable energy sources such as hydro, wind, and solar power with conventional generators such as diesel and gas turbines in off-grid, end-of-grid, and on-grid applications without compromising the efficient operation of the conventional or the renewable power generator units. Using such an SWPC permits the renewable power sources to be used as the primary sources while still ensuring continuous operation, thereby reducing fuel consumption of the conventional power generators.

Yet another use for the present invention is in backup power systems. Backup power systems are used to provide power to facilities when the utility grid fails. These systems usually consist of a diesel generator (the primary power supply when operating off-line), batteries that provide temporary power during generator start-up, a power inverter that inverts the DC battery or generator output to AC power, and a static switch that transfers the load from the utility grid to the backup power supply when needed. This entire system is conventionally referred to as an uninterruptible power supply (UPS). Unfortunately, most UPS systems suffer from one significant shortcoming-if one of the major components fails, the entire system is compromised.

Figure 11A:
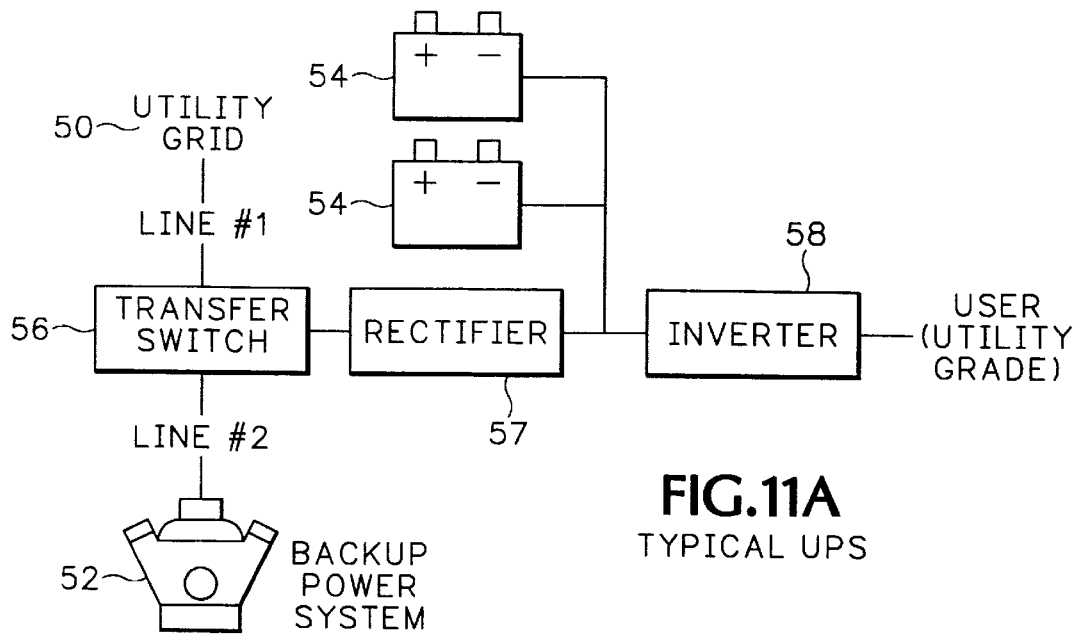
FIG. 11A is a schematic illustration of a prior art uninterruptible power supply system for providing backup power.

More specifically, in a typical UPS system, such as the one shown in FIG. 11A, a utility grid 50 and a backup power system (generator) 52 are not synchronized. A transfer switch 56 selects between the two power source input lines #1 and #2 depending on which power source 50 or 52 is desired. When the utility grid 50 fails, the backup power line #2 is activated to supply power from the backup power source 52. One or more batteries 54 provide temporary DC power that is inverted to AC power for the user. After the generator 52 comes to normal operating speed, power will be provided solely by the generator 52. A rectifier 57 is used to rectify the power from the utility grid 50 or the generator 52 to DC power. An inverter 58 inverts the incoming DC power to AC power. Because of this interdependent component configuration, if any one of the components fails, the entire system is compromised.

Figure 11B:
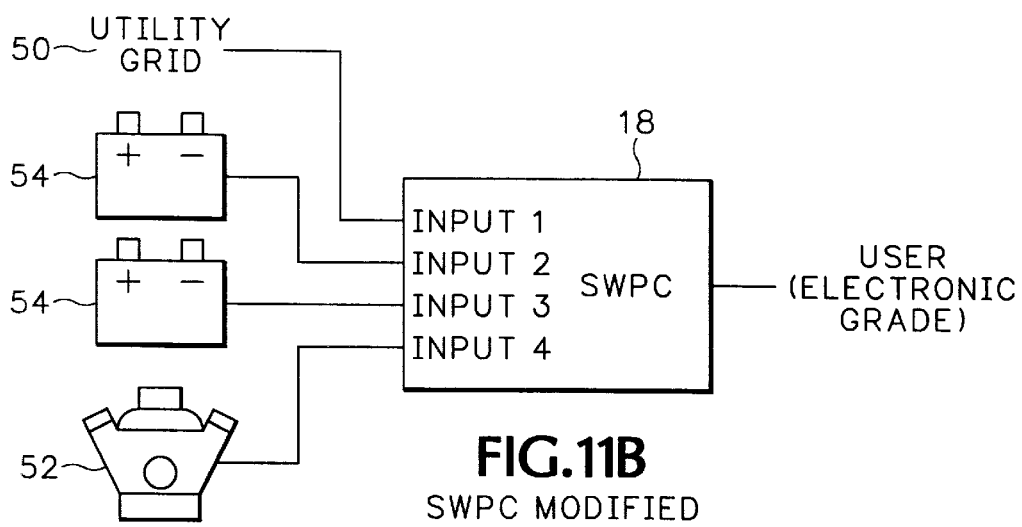
FIG. 11B is a schematic illustration of the step wave power converter of the present invention for use as a backup power system according to yet another embodiment of the invention.

Unlike the conventional system, the SWPC of this invention, when used in a UPS application as schematically illustrated in FIG. 11B, can accommodate and integrate multiple power sources 50, 52, 54. The ability to integrate multiple power sources gives the SWPC 18 important advantages over the typical UPS systems. First of all, the invention eliminates the need for the transfer switch 56 (see FIG. 11A) that is used with many UPS systems. This invention therefore provides truly seamless "uninterruptible" power. This invention also preferably isolates each power source 50, 52, 54 from the system to provide continuous voltage regulation. If one of the power sources, such as the utility grid 50, becomes inactive or is deliberately disconnected, this embodiment of the invention will regulate the power output using the remaining power sources 52, 54. This feature can eliminate costly down times by allowing scheduled service of power supplies without affecting the user. When combined with the rugged and reliable design of the SWPC 18 relative to commercial inverters that reside within the UPS, this architecture is much more reliable and useful than a typical UPS system.

The SWPC 18 can also condition the power from the utility grid that is to be used with sensitive electronics-a process that conventionally requires additional equipment provided by the end user. This provides improved efficiency, regulation, and isolation over the use of ferro-resonant transformers, as are conventionally used. The flexibility of the SWPC 18 also gives the end user room for expansion or modernization of power sources. For example, an existing diesel generator 52 or battery bank 54 could be replaced with fuel cells as they become available.

Yet a further application of this invention is in integrating power from photovoltaic (PV) cell or battery arrays. PV cells and batteries are power sources for which the SWPC of this invention is ideally suited. This is because these DC sources are typically made up of multiple, independent "strings". PV arrays, for example, typically consist of multiple strings of PV cells. Larger battery banks are also typically arranged as parallel strings of batteries and will benefit from use of the SWPC. Each string delivers power as a DC output voltage. The SWPC 18 can treat each string as an independent source and electrically integrate the multiple strings, while maintaining isolation between them. This is a key advantage of the SWPC 18 because if one or more strings malfinction, the SWPC 18 can continue to deliver utility- or electronic-grade AC power from the still-functioning strings.

Additionally, the SWPC 18 of this invention can cater to various nominal DC voltage levels among the strings. Existing inverter systems deal with nominal DC voltage levels through individual voltage regulators on each string or by merging all of the DC power on a single DC bus and then inverting the power from the bus to AC power. In some cases, inverters are attached to each string and the AC power from each inverter is combined to feed the load. The SWPC 18 drastically simplifies and improves the power conversion architecture compared with prior art inverters for PV arrays allowing maximum power point tracking of each input.

A still further application of this invention exists with respect to fuel cells. Fuel cells create electricity using an electrochemical process. They differ from batteries, which also use an electrochemical process, in that they consume hydrogen and must therefore have fuel continuously provided. The type of fuel used to generate hydrogen varies and depends on the reforming process for which each system is designed. Fuel cells are well suited for distributed generation, but each system must be tailored to the application that it will serve. Some applications may require higher power quality than others; some may need to be interconnected with the utility grid; some may require several fuel cells to be paralleled together; while some may implement co-generation where waste heat of the fuel cell is used along with the electrical energy. All these applications require power conditioning and custom electrical interconnections with the end user's facility.

The electricity generated from fuel cells is also DC and must be regulated or converted to AC for user consumption. Conventionally, this is accomplished by using a power converter that is often not integrated into the design. The SWPC 18 of this invention offers clear advantages over present techniques. One primary advantage in fuel cell integration offered by the SWPC 18 is parallel operation of multiple fuel cells where each unit may be individually loaded. Another advantage is the ability to follow fuel cell voltage versus loading curves and limits.

Two conventional methods exist for consolidating the power of multiple fuel cells servicing a single user. One method is to use voltage regulators for each fuel cell and to have a common bus to which these voltage regulators feed power. The power from the common bus is then converted by a single power converter and fed to the user. A second method is to use a power converter for each fuel cell, combine the converted power and feed it to the user. Both of these techniques are costly because of the duplication of system components for each fuel cell.

Referring again to FIGS. 11A and 11B, the SWPC 18 has a distinct advantage over the prior art described above. Specifically, one or more power sources, i.e., 52, 54, for the SWPC 18 can be a fuel cell. By replacing the battery banks 54 with fuel cells, the SWPC 18 allows each fuel cell 54 to operate at peak efficiency by isolating each fuel cell 54 from the others, as with the other power sources already described above. The SWPC 18 converts the power to AC and supplies it to the user. This simplifies the architecture and allows one or more of the fuel cells 54 to be taken off-line without any adverse effects.

Still further benefits of this invention exist with respect to grid-connected applications that have one or more inputs from the grid. In present input grid-connected applications, the fuel cell 54 is connected to an inverter in synchronization with the utility grid 50. It is disconnected from the grid 50 (i.e., for servicing) using a transfer switch 56. The SWPC 18 of this invention offers a clear advantage over the transfer switch 56. Both the utility grid 50 and the fuel cell 54, or multiple fuel cells 54, are used as power sources for the SWPC 18. The SWPC 18 conditions the power for the user and isolates each fuel cell 54 from the utility grid. The SWPC 18 allows each fuel cell 54 to operate under the preferred conditions for fuel efficiency or co-generation. In addition, since all power sources are isolated by the SWPC 18, there is no need for a costly transfer switch 56 in the event one of the sources fails. The SWPC 18 will simply use the remaining power sources 50, 52, 54 to create high quality power.

Fuel cells 54 can also provide power when the grid 50 is not active or when there is no grid available. When power from the utility grid 50 is lost, the fuel cell 54 will provide backup emergency power for the user. For UPS systems, the fuel cell 54 can effectively replace the diesel generator source 52, which is commonplace today.

The invention's ability to integrate multiple power sources further gives the end user the ability to expand the system power capacity in the future without costly system upgrades or the purchase of an entirely new system. With simple software modifications, the SWPC 18 of this invention can be upgraded to accommodate multiple fuel cells, interconnection with the utility grid, or to parallel other types of power sources with the fuel cell.

Having described and illustrated the principles of the invention in several preferred embodiments thereof, it should be apparent that the invention can be modified in arrangement and detail without departing from such principles. Particularly, the features and advantages of all of the various embodiments can be arranged together in any combination, depending only on the desired application. We therefore claim all modifications and variations coming within the spirit and scope of the following claims.

We claim:

1. A step wave power converter comprising:
   a plurality of transformers each configured to receive a DC voltage from one of multiple independently generated power sources, each transformer comprising a primary winding and a secondary winding and being configured to selectively supply one or more steps for a step wave AC output;
   a plurality of bridge circuits each for controlling a different one of multiple different DC voltage inputs from one of the multiple independently generated power sources into the primary windings in order to output steps for the step wave AC output from the secondary windings; and
   source management circuitry for individually managing how each of the DC voltage inputs are switched by the bridge circuits, according to each power source's performance characteristics.

2. The step wave power converter according to claim 1, wherein the step wave AC output is a single-phase AC output.

3. The step wave power converter according to claim 1, wherein the AC output is three-phase AC output.

4. The step wave power converter according to claim 3, wherein each transformer comprises a three-phase transformer having three primary windings and three secondary windings; wherein each of the bridge circuits comprises multiple gate pairs, each gate pair having two gates arranged in series; and wherein opposite ends of each of the primary windings of each of the three-phase transformers are connected between the gates of separate gate pairs in a corresponding one of the bridges.

5. The step wave power converter of claim 4, wherein each bridge circuit further comprises a plurality of antiparallel diodes, each antiparallel diode being fitted to one of the gates to allow shorting current flow through one or more of the primary windings of a shorted transformer.

6. The step wave power converter according to claim 3, wherein each bridge circuit comprises six gates arranged in three, two-gate, series configured pairs.

7. The step wave power converter of claim 6, wherein each bridge circuit further comprises a plurality of antiparallel diodes, each antiparallel diode being fitted to one of the gates to allow shorting current flow through one or more of the primary windings of a shorted transformer.

8. The step wave power converter according to claim 1 wherein the management circuitry varies a number of the steps each of the independent power sources contribute to the step wave AC output according to an amount of energy available from the different independent power sources.

9. The step wave power converter according to claim 1, further comprising:
   control circuitry for controlling the amount, duration, and polarity of DC voltage supplied to each of the primary windings of each of the transformers.

10. The step wave power converter according to claim 1, further comprising:
    a pulse width modulator for controlling an input into a selected one of the primary windings to fine tune the step wave AC output in substantial conformance with an ideal AC waveform.

11. A step wave power converter comprising:
    a plurality of transformers configured to receive DC voltage from one or more power sources, each transformer comprising a primary winding and a secondary winding and being further configured to supply a step for a step wave AC output;
    a plurality of bridge circuits for controlling DC voltage inputs into the primary windings of the transformers in order to output the steps of the step wave AC output from the secondary windings of the transformers; and
    a pulse-width modulator for further controlling the DC voltage inputs into one or more of the primary windings.

12. A three-phase step wave power converter comprising:
    a plurality of three-phase transformers, each three-phase transformer comprising primary windings and secondary windings and being configured to receive DC voltage from one or more power sources and to supply a step for each phase of a three-phase step wave AC output;
    a plurality of bridge circuits, each bridge circuit comprising multiple gate pairs arranged in parallel, wherein each gate pair comprises two or more gates arranged in series; and
    each bridge circuit being connected to the primary windings of one of the transformers, wherein opposite ends of the primary windings are connected between gates in separate gate pairs.

13. The power converter of claim 12, wherein the primary windings are arranged in a delta configuration.

14. The power converter of claim 13, wherein a first end of a first primary winding is connected between gates in a first one of the gate pairs and a second end of the first primary winding is connected between gates of a third one of the gate pairs; wherein a first end of a second primary winding is electrically coupled to the second end of the first primary winding and a second end of the second primary winding is connected between gates in a second one of the gate pairs; and wherein a first end of a third primary winding is electrically coupled to the second end of the second primary winding and a second end of the third primary winding is electrically coupled to the first end of the first primary winding.

15. The power converter of claim 13, wherein the secondary windings are arranged in a wye configuration.

16. The power converter of claim 15, further comprising a phase management controller for enhancing a resolution of the three-phase step wave AC output by managing characteristics of the voltage transformation between the delta configuration of the primary windings and the wye configuration of the secondary windings.

17. A method for enhancing a three-phase step wave AC output from a three-phase step wave power converter having a plurality of three-phase transformers arranged with delta-wye primary to secondary winding configurations, comprising:

receiving one or more DC voltage inputs into the step wave power converter;

generating one or more steps of the three-phase step wave AC output from the secondary windings of the three-phase transformers;

increasing the number of steps in the three-phase step wave AC output by controlling timing and sequencing of the DC voltage inputs into the primary windings of the delta-wye three-phase transformers to take advantage of inherent properties of the delta-wye transformation.

18. The step wave power converter according to claim 17, wherein each DC power source is provided with cut-off gates to allow it to be selectively disconnected from the system according to performance of the DC power sources.

19. The step wave power converter according to claim 18, wherein at least one power source is provided with a bypass switch to allow it to be readily disconnected from the system.

20. A step wave power converter comprising:

a transformer configured to receive DC voltage input from a DC bus, the DC bus configured to receive power from one or more power sources, said transformer comprising a primary winding and a secondary winding and being configured to supply a step for a step wave AC output; and an isolation circuit for isolating the DC bus from at least one of the power sources.

21. The step wave power converter according to claim 20, wherein at least one of the power sources is an input power grid and wherein the isolation circuit isolates the DC bus from the input power grid to prevent backfeed to the grid from the DC bus.

22. The step wave power converter according to claim 20, wherein at least one of the power sources supplies a variable frequency power input to the DC bus.

23. A step wave power converter comprising:

a plurality of transformers configured to receive DC voltage inputs from one or more DC power sources or rectified AC power sources, each transformer comprising a primary winding and a secondary winding and being configured to supply a step of a step wave AC output;

a plurality of bridge circuits for controlling the DC voltage inputs into the primary windings of the transformers in order to output steps for the step wave AC output from the secondary windings of the transformers; and control circuitry for controlling the amount, duration, and polarity of DC voltage supplied to each of the primary windings of to each of the transformers.

24. A method for enhancing characteristics of a step wave AC output from a step wave power converter, comprising:

supplying a DC voltage input to the step wave power converter;

transforming the DC voltage input into a plurality of steps of the step wave AC waveform; and pulse-width modulating the DC voltage input while the DC voltage is being transformed into a step of the AC waveform.

25. The method of enhancing the step wave AC output according to claim 24, wherein:

supplying a DC voltage input comprises supplying a plurality of DC voltage inputs to a plurality of transformers; and wherein pulse-width modulating the DC voltage input comprises pulse-width modulating the voltage input into a selected one of the transformers while holding the voltage input into another one of the transformers in a constant on or off state, in order to fine-tune the step wave AC output in substantial conformity with an ideal AC sine wave.

* * * * *